United States Patent
Wei et al.

(10) Patent No.: US 11,198,097 B2
(45) Date of Patent: Dec. 14, 2021

(54) OSMOTIC PRESSURE ASSISTED REVERSE OSMOSIS PROCESS AND METHOD OF USING THE SAME

(71) Applicant: TREVI SYSTEMS INC., Petaluma, CA (US)

(72) Inventors: Qiang Wei, Petaluma, CA (US); John Webley, Petaluma, CA (US); Elliott Baker, Petaluma, CA (US); Gary Carmignani, Petaluma, CA (US)

(73) Assignee: TREVI SYSTEMS INC., Petaluma, CA (US)

( * ) Notice: Subject to any disclaimer, the term of this patent is extended or adjusted under 35 U.S.C. 154(b) by 0 days.

(21) Appl. No.: 16/074,623

(22) PCT Filed: Dec. 15, 2016

(86) PCT No.: PCT/US2016/066995
§ 371 (c)(1),
(2) Date: Aug. 1, 2018

(87) PCT Pub. No.: WO2017/136048
PCT Pub. Date: Aug. 10, 2017

(65) Prior Publication Data
US 2019/0054421 A1    Feb. 21, 2019

Related U.S. Application Data

(60) Provisional application No. 62/392,203, filed on May 24, 2016, provisional application No. 62/388,563, filed on Feb. 2, 2016.

(51) Int. Cl.
*B01D 61/02* (2006.01)
*B01D 61/12* (2006.01)
(Continued)

(52) U.S. Cl.
CPC .......... *B01D 61/12* (2013.01); *B01D 61/002* (2013.01); *B01D 61/025* (2013.01); *B01D 61/58* (2013.01);
(Continued)

(58) Field of Classification Search
CPC .. B01D 61/002; B01D 61/022; B01D 61/025; B01D 61/027; B01D 61/12;
(Continued)

(56) References Cited

U.S. PATENT DOCUMENTS 3,580,841 A    5/1971 Cadotte et al.
9,206,060 B1  12/2015 Abusharkh
(Continued)

FOREIGN PATENT DOCUMENTS

| JP | 2002-001068 A | 1/2002 |
| JP | 201616384 A † | 2/2016 |
| WO | 2015157818 A1 | 10/2015 |

OTHER PUBLICATIONS

Tzahi Y. Cath, Osmotically and thermally driven membrane processes for enhancement of water recovery in desalination processes, Desalination and Water Treatment 15 (2010) 279-286. (Year: 2010).*
(Continued)

*Primary Examiner* — Pranav N Patel
(74) *Attorney, Agent, or Firm* — Polsinelli PC

(57) ABSTRACT

Devices, methods, and systems for producing a concentrated feed stream and a diluted feed stream using a solute stream provided to the low pressure side of the semi-permeable membrane during a reverse osmosis process. The process includes providing a semipermeable membrane having a first side and a second side and introducing a first feed solution stream on the first side of the membrane and a second feed solution stream on the second side, wherein the osmotic pressure of the of the first feed solution stream is (Continued)

greater than or equal to the osmotic pressure of the second feed solution stream. The process further includes exerting hydrostatic pressure on the first side of the membrane such that solvent passes from the first side to the second side thereby producing a concentrated first feed solution stream and a diluted second feed solution stream. Devices and systems for performing the processes are provided.

8 Claims, 10 Drawing Sheets

(51) Int. Cl.
  *B01D 61/58* (2006.01)
  *C02F 1/44* (2006.01)
  *B01D 61/00* (2006.01)
  *C02F 9/00* (2006.01)
  *C02F 103/08* (2006.01)
  *C02F 1/38* (2006.01)
  *B01D 61/14* (2006.01)

(52) U.S. Cl.
  CPC .............. *C02F 1/441* (2013.01); *C02F 1/445* (2013.01); *C02F 9/00* (2013.01); *B01D 61/022* (2013.01); *B01D 61/027* (2013.01); *B01D 61/145* (2013.01); *B01D 2311/14* (2013.01); *B01D 2311/25* (2013.01); *B01D 2317/022* (2013.01); *C02F 1/38* (2013.01); *C02F 1/442* (2013.01); *C02F 1/444* (2013.01); *C02F 2103/08* (2013.01); *C02F 2209/03* (2013.01); *C02F 2301/08* (2013.01); *Y02A 20/131* (2018.01)

(58) Field of Classification Search
  CPC .. B01D 61/145; B01D 61/58; B01D 2311/14; B01D 2311/25; B01D 2317/022; C02F 1/38; C02F 1/441; C02F 1/442; C02F 1/444; C02F 1/445; C02F 2103/08; C02F 2209/03; C02F 2301/08; C02F 9/00; Y02A 20/131
  See application file for complete search history.

(56) References Cited

U.S. PATENT DOCUMENTS

| | | |
|---|---|---|
| 2004/0134521 A1 | 7/2004 | Liberman |
| 2010/0032377 A1 | 2/2010 | Wohlert |
| 2012/0012511 A1* | 1/2012 | Kim ................... B01D 61/002 210/170.11 |
| 2013/0186822 A1 | 7/2013 | Herron et al. |
| 2014/0102982 A1 | 4/2014 | Fairchild |
| 2015/0136699 A1† | 5/2015 | Wohlert |
| 2015/0367285 A1† | 12/2015 | Chang |

OTHER PUBLICATIONS

English language machine translation of JP2002001068, 13 pages, No Date.*
PCT Search Report and Written Opinion dated Apr. 13, 2017 in corresponding PCT Application No. PCT/US2016/066995 filed Dec. 15, 2016, 14 pages.
Supplementary European Search Report, dated Jan. 15, 2020, 11 pages.
Loeb et al. "Countercurrent Flow Osmotic Processes for the Production of Solutions Having a High Osmotic Pressure," Desalination, 13 (1973), pp. 207-215.†

* cited by examiner
† cited by third party

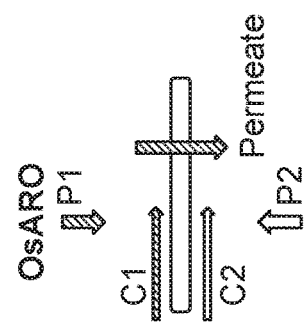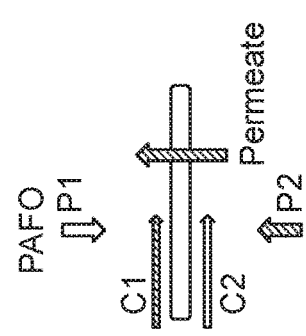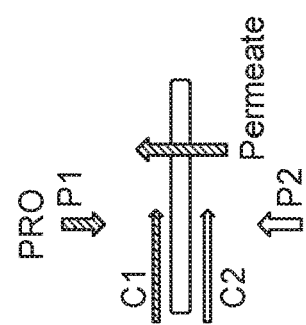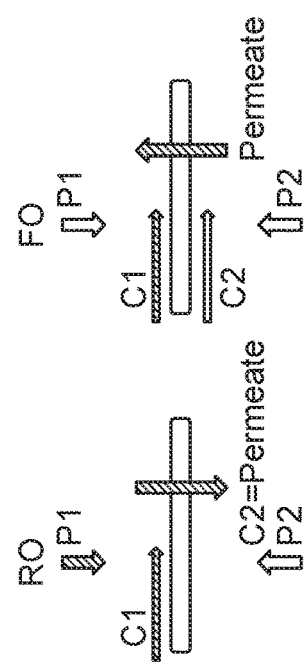
FIG. 3A  FIG. 3B  FIG. 3C  FIG. 3D  FIG. 3E

OSMOTIC PRESSURE ASSISTED REVERSE OSMOSIS PROCESS AND METHOD OF USING THE SAME

CROSS REFERENCE TO RELATED APPLICATIONS

This application is a National Stage of International Application No. PCT/US2016/066995, entitled "Osmotic Pressure Assisted Reverse Osmosis Process and Method of Using the Same," filed on Dec. 15, 2016, which claims the benefit of U.S. Provisional Application No. 62/388,563, entitled "Osmotic Pressure Assisted Reverse Osmosis (OsARO) Process," filed on Feb. 2, 2016, and U.S. Provisional Application No. 62/392,203, entitled "Osmotic Pressure Assisted Reverse Osmosis (OsARO) Process and Method of Using the Same," filed on May 24, 2016, each of which are incorporated by reference in their entirety, for all purposes, herein.

FIELD OF TECHNOLOGY

The present disclosure is directed to the purification, decontamination, or desalination of sea water, brackish water, waste water, industrial water, produced water and/or contaminated water using an osmotic pressure assisted reverse osmosis process. The present disclosure is further directed to forming concentrated feedstock solutions using an osmotic pressure assisted reverse osmosis process and producing purified water as a by-product.

BACKGROUND

Certain membranes allow solvent molecules to pass through them but not solute molecules. Such membranes are referred to as semipermeable. Semipermeable membranes can be utilized in desalination and water purification technologies.

Forward osmosis is known in the art and has been the subject of recent study due to the likelihood of future fresh water shortages and a corresponding increase in demand for cost effective desalination and water purification technologies. Sea water, brackish water or otherwise contaminated water can be purified by drawing the water (the solvent) through a semipermeable membrane, which rejects the salts and other contaminants (the solutes). In forward osmosis processes, the water is drawn through the semipermeable membrane using a draw solution with higher osmotic pressure than the feed. The forward osmosis process does not purify the water. Forward osmosis simply moves the water from one set of solutes to another set of solutes.

The process of reverse osmosis has also been applied in water purification technologies. In particular, reverse osmosis has been used to desalinate sea water, brackish water or otherwise contaminated water by removing salts from the water to make drinkable or otherwise industrially usable water. In forward osmosis, solvent flows from a dilute solution through a semipermeable membrane to a more concentrated solution. By applying a pressure equal to the osmotic pressure to the more concentrated solution, the osmotic process can be stopped. By applying an even greater pressure, the osmotic process can be reversed. In this instance, solvent flows from the concentrated solution (such as sea water) through the semipermeable membrane to the more dilute solution. The hydrostatic pressure requirements of reverse osmosis can make reverse osmosis energetically expensive. Additionally, the evaporation and crystallization processes involved in zero liquid discharge (ZLD) systems, used to concentrate solutes beyond that of traditional RO, are also costly. Therefore, systems, methods and techniques capable of reducing the energy costs or increasing the efficiency of reverse osmosis systems and other water purification systems is desirable.

BRIEF DESCRIPTION OF THE DRAWINGS

Embodiments of the present application are described, by way of example only, with reference to the attached Figures, wherein:

FIG. 3A-E is a series of diagrams comparing the OsARO system to reverse osmosis (RO), forward osmosis (FO), pressure retarded osmosis (PRO), and pressure assisted FO (PAFO) systems, according to an example embodiment of the present disclosure;

Figure 1:
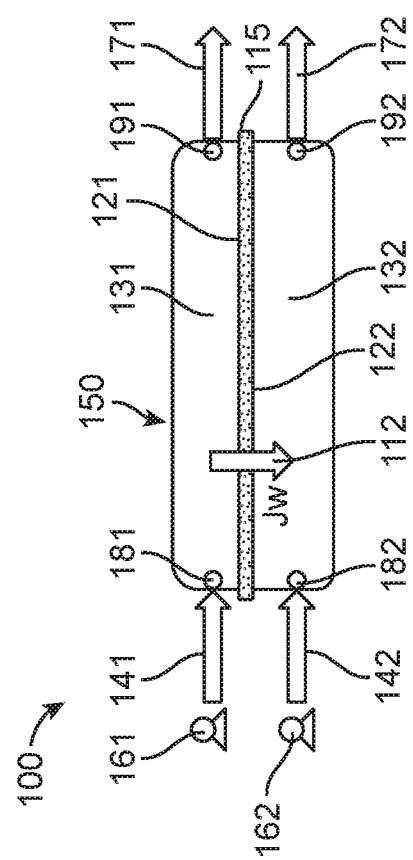
FIG. 1 is a diagram of a single stage osmotic pressure assisted reverse osmosis (OsARO) system, according to an example embodiment of the present disclosure.

It should be understood that the various aspects are not limited to the arrangements and instrumentality shown in the drawings.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "OsARO" refers to osmotic assisted reverse osmosis and can also be referred to as forward osmosis pre-treatment reverse osmosis (FO-PRO) or forward osmosis osmotic recovery membrane (FO-ORM). The term "coupled" is defined as connected, whether directly or indirectly through intervening components, and is not necessarily limited to physical connections. The term "fluidically coupled" is defined as connected, either directly or indirectly through intervening components, and the connections are not necessarily limited to physical connections, but are connections that accommodate the transfer of solutions, dispersions, mixtures, or other fluids between the so-described components. The connections can be such that the objects are permanently connected or reversibly connected. The terms "comprising," "including" and "having" are used interchangeably in this disclosure. The terms "comprising," "including" and "having" mean to include, but are not necessarily limited to, the things so described.

As used herein, the terms "purify," "purified," or "purification," in their various forms, refer to one or more processes that produce water having at least an incremental increase in purity and/or an incremental decrease in solute concentration or contaminant concentration. As such, the terms "purify," "purified," or "purification," do not necessarily refer to the production of water having a particular purity or a particular solute concentration, rather, the terms are used to refer to the production of water having at least an incremental increase in purity and/or an incremental decrease in solute concentration or contaminant concentration, resulting from the presently disclosed methods and techniques.

As used herein, the term "stream," in its various forms, including its use in the term "feed stream," refers to a solution that may be flowed to or received in a portion or component of an apparatus or system of the present disclosure, and is not limited to solutions introduced into an apparatus or system, or portion thereof, under continuous flow, but rather, may also include solutions received in an apparatus or system for a period of time, such as that which may be employed in a series of batch processes.

According to at least one aspect of the present disclosure, an apparatus is provided. The apparatus may include a first feed solution source and a second feed solution source. The apparatus may further include a semipermeable membrane that includes a first side configured to receive a first feed solution stream from the first feed solution source and a second side configured to receive a second feed solution stream from the second feed solution source. The first feed solution stream may have a first solute concentration and a first osmotic pressure while the second feed solution stream may have a second solute concentration and a second osmotic pressure. The first osmotic pressure is greater than or equal to the second osmotic pressure. The first feed solution source is configured to provide hydrostatic pressure to the first side of the semipermeable membrane so as to produce a concentrated first feed solution stream and a diluted second feed solution stream by solvent passing, in the form of a permeate solution, from the first feed solution stream to the second feed solution stream via the semipermeable membrane.

According to at least one aspect of the present disclosure, a process for concentrating a solute in a solution comprising solvent and solute is provided. The process includes providing a semipermeable membrane having a first side and a second side. The process further includes introducing a first feed solution stream on the first side of the semipermeable membrane and introducing a second feed solution stream on the second side of the semipermeable membrane. The first feed solution stream may have a first solute concentration and a first osmotic pressure while the second feed solution stream may have a second solute concentration and a second osmotic pressure. The first osmotic pressure is greater than or equal to the second osmotic pressure. The process further includes exerting hydrostatic pressure on the first side of the semipermeable membrane such that solvent passes, in the form of a permeate solution, from the first side of the semipermeable membrane to the second side of the semipermeable membrane thereby producing a concentrated first feed solution stream and a diluted second feed solution stream.

FIG. 1 illustrates an apparatus 100 according to an example embodiment of the present disclosure. As depicted in FIG. 1, apparatus 100 includes a single OsARO module 150 for concentrating a first feed solution 141 while diluting a second feed solution 142 using a semipermeable membrane 115. The OsARO module includes a first chamber 131 and a second chamber 132 opposite the first chamber 131. A semipermeable membrane 115 is disposed at the interface between the first chamber 131 and the second chamber 132. The semipermeable membrane 115 has a first side 121 in fluidic communication with the first chamber 131 and a second side 122 in fluidic communication with the second chamber 132.

During operation, the OsARO module 150 is configured to receive a first feed solution stream 141 having a solute concentration C1 and osmotic pressure $\pi(C1)$. The first feed solution stream 141 is introduced to first chamber 131 and the first side 121 of semipermeable membrane 115 while subjected to hydraulic pressure P1. In at least some instances, the first feed solution stream 141 enters the first chamber 131 via an inlet port, such as inlet port 181 shown in FIG. 1.

The OsARO module 150 is further configured to receive a second feed solution stream 142 into the second chamber 132 and on the second side 122 of semipermeable membrane 115. The second feed solution stream 142, has a solute concentration C2 and an osmotic pressure $\pi(C2)$ that is smaller or equal to the osmotic pressure $\pi(C1)$ of the first feed solution stream 141 fed on the opposite first side 121 of the semipermeable membrane 115. The second feed solution stream 142 is fed into the second chamber 132 and on the second side 122 of the semipermeable membrane 115 at a hydraulic pressure P2 that is less than the hydraulic pressure P1 of the first feed solution stream 141. In some instances, the solute concentration C1 of the first feed solution stream 141 is greater than the solute concentration C2 of the second feed solution stream 142. In other instances, the solute concentrations C1 and C2 can be the same. In at least some instances, the second feed solution stream 142 enters the second chamber 132 via an inlet port, such as inlet port 182 shown in FIG. 1.

As a result of the balance of hydraulic pressures and osmotic pressures, solvent, in the form of permeate 112 passes from the first chamber 131 to the second chamber 132 via semipermeable membrane 115, thereby concentrating the first feed solution stream 141 ($C1_{out} > C1_{in}$) to form a concentrated first feed solution stream 171 while diluting the second feed solution stream 142 ($C2\_in > C2\_out$) to form a diluted second feed solution stream 172. According to the presently disclosed technique, the reverse osmosis (RO) process is partially driven by the osmotic pressure provided by the second feed solution stream 142, resulting in a more energetically efficient Osmotic Pressure Assisted Reverse Osmosis (OsARO) process.

According to at least one aspect of the present disclosure, the first chamber 131 of OsARO module 150 may be fluidically coupled with a first feed solution source 161 configured to flow the first feed solution stream 141 to the first chamber 131 and on the first side 121 of semipermeable membrane 115. The first feed solution source 161 may be a high pressure pump, as depicted in FIG. 1, or may be, in at least some instances, the first or second chamber of another OsARO module. In at least some instances, the first feed solution source 161 may be a reverse osmosis component or a forward osmosis component.

Similarly, in at least some instances, the second chamber 132 of OsARO module 150 may be fluidically coupled with a second feed solution source 162 configured to flow the second feed solution stream 142 to the second chamber 132 and on the second side 122 of semipermeable membrane 115. The second feed solution source 162 may be a high pressure pump, as depicted in FIG. 1, or may be, in at least some instances, the first or second chamber of another OsARO module, a reverse osmosis component, or a forward osmosis component.

According to at least one aspect of the present disclosure, the osmotic pressure of the second feed solution stream 142 may be greater than the osmotic pressure of the permeate 112. In at least some instances, the first feed solution source 161 and the second feed solution source 162 may be configured to generate a pressure differential between the hydrostatic pressure of the first feed solution stream 141 and the second feed solution stream 142 sufficient to cause solvent to pass from the first side 121 of the semipermeable membrane 115 to the second side 122 of the semipermeable membrane 115 in the form of permeate 112. In some cases, the first feed solution source 161 and the second feed solution source 162 may be configured to vary the pressure differential as a function of the osmotic pressure of the second feed solution stream 142.

According to at least one aspect of the present disclosure, the concentrated first feed solution stream 171 may exit the first chamber 131 of the OsARO module 150 at an outlet port, such as outlet port 191 depicted in FIG. 1. Similarly, the diluted second feed solution stream 172 may exit the second chamber 132 of the OsARO module 150 at an outlet port, such as outlet port 192 depicted in FIG. 1. While the OsARO module 150 depicted in FIG. 1 is depicted as only having a single inlet port and outlet port for each of the chambers, first or second chambers having multiple inlet and/or outlet ports are within the spirit and scope of the present disclosure.

According to at least one aspect of the present disclosure, the concentrated first feed solution stream 171 and/or the diluted second feed solution stream 172 may be fed to another OsARO module or to a reverse osmosis component or a forward osmosis component. In at least some instances, the first feed solution source 161 may be configured to recirculate the concentrated first feed solution stream 171, or a portion thereof, to the first side 121 of the semipermeable membrane 115. In some cases, the second feed solution source 162 may be configured to provide at least a portion of the concentrated first feed solution stream 171 to the second side 122 of the semipermeable membrane 115.

According to at least one aspect of the present disclosure, the first feed solution stream 141 may be a contaminated solution. In some cases, the contaminated solution may be divided into at least two portions, with one portion forming the first feed solution stream 141 and another portion forming the second feed solution stream 142. In such instances, the first feed solution source 161 and the second feed solution source 162 are each configured to provide portions of the same contaminated solution to the first side 121 and second side 122 of the semipermeable membrane 115, respectively.

The first feed solution stream 141 and the second feed solution stream 142 can have the same or different chemical composition, and can be at the same temperature or a different temperature. The first and second feed solution streams can include of many different solution components, some of the solution components may contribute to the osmotic pressure, while others may not. Any solution that generates osmotic pressure can be used in the presently disclosed apparatus, systems, and methods.

In at least some instances, the solvent of either the first or second feed solution stream can be water, an inorganic salt, a polar organic solvent such as methanol or ethanol, or any other suitable solvent. In some instances, feed solution streams having inorganic salt solutes such as, for example, sodium chloride (NaCl), potassium chloride (KCl), magnesium chloride ($MgCl_2$), magnesium carbonate ($MgCO_3$), magnesium sulfate ($MgSO_4$), calcium chloride ($CaCl_2$), calcium sulfate ($CaSO_4$), calcium carbonate ($CaCO_3$), potassium acetate (KAc) or calcium magnesium acetate (CaMgAc) can be used. In other instances, feed solution streams having inorganic salt solutes comprising ionic species such as, for example, transition metals, lanthanides, and actinides can be used. In yet other instances, feed solution streams having inorganic salt solutes comprising species such as, for example cyanides, nitrates, nitrites, sulfates, sulfites, sulfonates, hydroxides, phosphates, phosphites, halides, acetates, arsenides, amines, carboxylates, and nitros can be used. In some instances, when water is the solvent, organic compound solutes having good water solubility such as, for example, alcohols, dioxane, acetone, tetrahydrofuran (THF), dimethyl formamide (DMF), and dimethyl sulfoxide (DMSO) can be used. In some instances, organic compound solutes having water solubility such as aromatics such as toluene and benzene, linear alkanes or alkenes such as hexane or octane, chlorinated solvents such as methylene chloride ($CH_2Cl_2$), organic sulfonates, and organic acid may be used as solutes in the feed solution streams. In some instances polymer solutes, such as, but not limited to, sugar, ethylene oxide (EO), propylene oxide (PO), polyethylene glycols (PEG), poly(acrylic acid), poly(vinyl alcohol) poly (ethylene oxide), poly(vinyl acid), poly(styrenesulfonate), poly(acrylamide)-based polyelectrolytes, poly(diallyldimethylammonium chloride), poly(allylamine hydrochloride), poly(vinylpyrrolidone), poly(N-isopropylacrylamide), poly (alkylacrylates), polyalkylacrylic acids, poly(2-oxazoline) and polyethylenimine, and copolymers or block copolymers thereof, or any combination thereof can be used.

The hydraulic pressure P1 of the first feed solution stream can be a applied at any pre-determined pressure ranging from 50 to 5,000 psi, alternatively from 100 to 3,000 psi, alternative from 200 to 1,500 psi, or alternatively from 250 to 1,000 psi. The hydraulic pressure P2 of the second feed solution stream can be applied at any predetermined pressure ranging from 0 to 500 psi, alternatively from 2 to 200 psi, alternatively from 5 to 100 psi, alternatively from 10 to 50 psi, or alternatively from 14 to 30 psi.

The osmotic pressure $\pi(C)$ of the feed solution streams used in the OsARO module is related to the type of semipermeable membrane used. The semipermeable membrane implemented in the OsARO module can be any type of membrane such as, for example, microfiltration, ultrafiltration, nanofiltration, forward osmosis or reverse osmosis membranes, which can be made from cellulose triacetate (CTA), polybenzimidazole (PBI), thin film composite (TFC) membrane or any other chemistry that one skilled in the art would use. The semipermeable membranes can have any suitable geometric configuration such as, for example a flat sheet or a plurality of stacked or layered sheets, or a plurality of hollow nanotubes or nanofibers. Furthermore, the semipermeable membrane can be operated in any suitable configuration such as dead end, cross flow, co-current, countercurrent, or radial.

Figure 2:
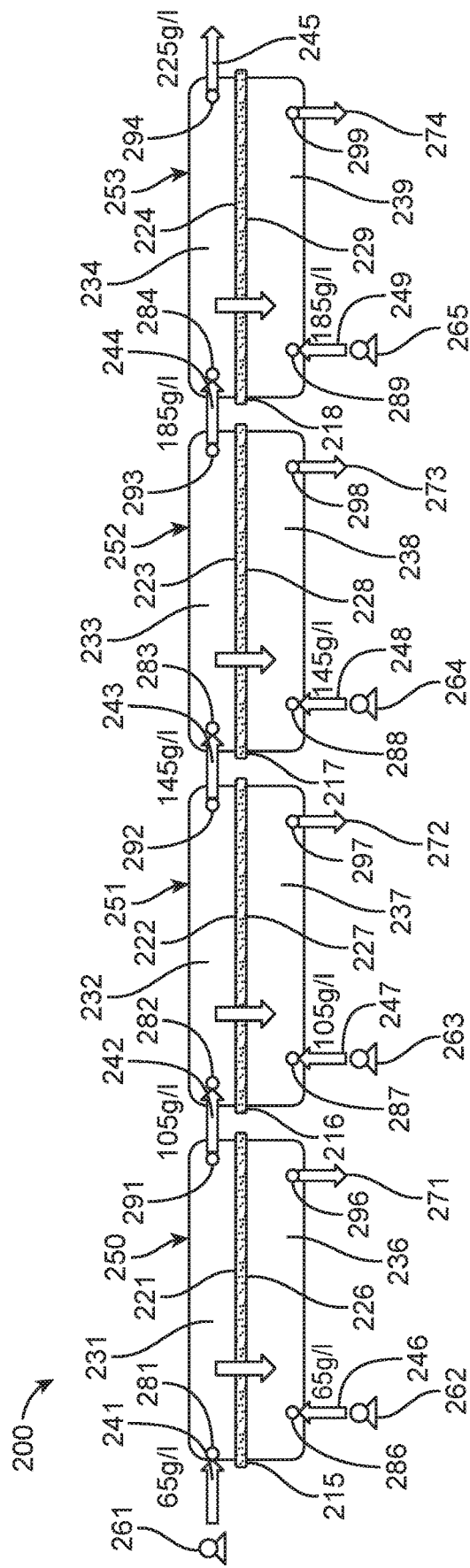
FIG. 2 is a diagram of a multiple stage OsARO system, according to an example embodiment of the present disclosure.

FIG. 2 illustrates an apparatus 200, according to an example embodiment of the present disclosure. As depicted in FIG. 2, apparatus 200 includes multiple OsARO modules 250-253 fluidically coupled to each other in a series for successive separation steps or stages, in which the initial first feed solution stream 241 can be incrementally concentrated to high concentrations. Each OsARO module 250-253 includes a first chamber 231-234, a second chamber 236-239 and a semipermeable membrane 215-218 disposed at the interface between the first chamber 231-234 and the second chamber 236-239. Each semipermeable membrane 215-218 has a first side 221-224 in fluidic communication with the first chamber 231-234 and a second side 226-229 in fluidic communication with the second chamber 236-239.

During operation, the first OsARO module 250 is configured to receive an initial first feed solution stream 241. The initial first feed solution stream 241 is introduced to the first chamber 231 of the first module 250 as well as the first side 221 of semipermeable membrane 215 while subjected to hydraulic pressure. As depicted in FIG. 2, the initial first feed solution stream 241 enters the first chamber 231 via inlet port 281 from first feed solution source 261. The first module 250 is further configured to receive a second feed solution stream 246, from second feed solution source 262, into the second chamber 236 and on the second side 226 of semipermeable membrane 215. The first feed solution source 261 and the second feed solution source 262 may be a high pressure pump or may be a reverse osmosis component or a forward osmosis component.

By way of example only, FIG. 2 depicts that the solute concentration of the initial first feed solution stream 241 is initially 65 g/l NaCl, matching the solute concentration of the second feed solution stream 246. The solute concentration of the feed solution streams may be any value so long as the osmotic pressure of the second feed solution stream 246 is smaller or equal to the osmotic pressure of the initial first feed solution stream 241 and the solute concentration of the second feed solution stream 246 is sufficient to assist the reverse osmosis process by reducing the required hydrostatic pressure necessary to produce permeate. In at least some instances, the use of a second feed solution stream having a solute concentration that is approximately equal to the solute concentration of the first feed solution stream, as depicted in FIG. 2, is advantageous because the second feed solution stream provides a significant osmotic pressure by which to facilitate the reverse osmosis process.

During operation, hydraulic pressure is exerted by the initial first feed solution stream 241 on the first side 221 of the semipermeable membrane 215 such that solvent passes from the first side 221 of the of the semipermeable membrane 215 to the second side 226 of the semipermeable membrane 215 thereby producing a concentrated first feed solution stream 242 in the first chamber of the first module 250 and a diluted second feed solution 271 in the second chamber 236. The example embodiment presented in FIG. 2 illustrates that the initial first feed solution stream 41 having a solute concentration of 65 g/l NaCl is concentrated to 105 g/l NaCl during operation of the first module 250, or first stage, of apparatus 200. As depicted in FIG. 2, the concentrated first feed solution is fed into the first chamber 232 of the second OsARO module 251, in the form of third feed solution stream 242, where the third feed solution stream is concentrated to 145 g/l NaCl due to the same process describe with respect to the first module 250. The concentrated third feed solution stream is then fed into the first chamber 233 of the third OsARO module 252, in the form of fifth feed solution stream 243 where the fifth feed solution stream 243 is concentrated to 185 g/l NaCl. The concentrated fifth feed solution stream is then fed into the first chamber 234 of the fourth OsARO module 253, in the form of seventh feed solution stream 244, where the seventh feed solution stream is concentrated to the targeted concentration of 225 g/l at outlet port 294. In each module 250-253, a different feed solution stream 246-249, each having a defined concentration C2 is introduced to the respective second chamber 236-239 in order to provide osmotic pressure driving force to assist the concentration of the feed solution streams in the respective first chambers 231-234.

In at least some instances, feed solution streams 247-249 may be fed to the second chambers 237-239 of modules 251-253 from feed solution sources 263-265. In some cases, feed solution sources 263-265 may be low pressure or high pressure pumps. In other cases, feed solution streams 247-249 may include at least a portion of the concentrated feed streams 242-244 of the preceding module. In such cases, the feed solution sources 263-265 may be the first chambers 231-233 of the preceding module 250-252. For example, the fourth feed solution stream 247 may comprise at least a portion of concentrated first feed solution stream 242 from the first chamber 231 of the first module 250.

According to at least one aspect of the present disclosure, the diluted feed solution streams 271-274 may be fed to another OsARO module or to a reverse osmosis component, as described with respect to additional exemplary embodiments provided below. For example, the diluted feed solution stream 272 from the second chamber 237 of the second module 251 may be fed to the second chamber 236 of the first module 250 to form, at least in part, the second feed solution stream 246.

As depicted in FIG. 2, the first chambers 231-234 of OsARO modules 250-253 have inlet ports 281-284 providing an entry path for feed solution streams into the first chambers 231-234. Additionally, the first chambers 231-234 have outlet ports 291-294 providing an exit path for the concentrated feed solution stream to leave the first chambers 231-234 and enter a subsequent stage or module. Similarly, the second chambers 236-239 include inlet ports 286-289 and outlet ports 296-299 to allow entry and exit of the feed solution streams to and from the second chambers 236-239. In some instances, the OsARO modules can be configured to have multiple inlets and multiple outlets for each of the respective feed solution streams. Furthermore, the OsARO modules can be used in continuous, batch, or semi-batch processes. In each process in each module, the feed solution streams can pass through the membrane a single time, or multiple times by recycling and recirculating. Additionally, the hydraulic pressure applied to the feed solution streams can be held constant or can be varied during the respective process steps.

According to at least one aspect of the present disclosure, apparatus 200, depicted in FIG. 2, may be used to perform a process for concentrating a solute, such as a contaminant, in a solution comprising solvent and solute. The process includes providing a first module 250 fluidically coupled with a first feed solution source 261 and a second feed solution source 262. The first module 250 may include a first chamber 231 and a second chamber 236. The first module 250 may further include a semipermeable membrane 215 disposed at the interface between the first chamber 231 and the second chamber 236. The semipermeable membrane 215 may have a first side 221 in fluidic communication with the first chamber 231 and a second side 226 in fluidic communication with the second chamber 236. The process further includes introducing, from the first feed solution source 261, a first feed solution stream 241 to the first chamber 231 and on the first side 221 of the semipermeable membrane 215.

The process further includes introducing, from the second feed solution source 262, a second feed solution stream 246 to the second chamber 236 and on the second side 226 of the semipermeable membrane 215. The osmotic pressure of the first feed solution stream 241 is greater than the osmotic pressure of the second feed solution stream 246. The process further includes exerting hydrostatic pressure on the first side 221 of the semipermeable membrane 215 such that solvent passes from the first side 221 to the second side 226 of the semipermeable membrane 215 thereby producing a concentrated feed solution stream 242 in the first chamber 231 and a diluted second feed solution stream 271 in the second chamber 236.

In at least some instances, the process may further include selecting the osmotic pressure of the second feed solution stream 246 so as to reduce the hydrostatic pressure needed to cause the solvent to pass from the first side 221 to the second side 226 of the semipermeable membrane 215, thereby producing a concentrated feed solution stream 242 and a diluted second feed solution stream 271. In other cases, the osmotic pressure of the second feed solution stream 246 may be a predetermined osmotic pressure selected to reduce the hydrostatic pressure necessary to cause the solvent to pass from the first side 221 to the second side 226 of the semipermeable membrane 215. In some cases, the osmotic pressure of the second feed solution stream 246 may be selected to be greater than the osmotic pressure of the permeate solution so as to reduce the hydrostatic pressure needed to cause the solvent to pass from the first side 221 to the second side 226 of the semipermeable membrane 215.

According to at least one aspect of the present disclosure, the process may further include recirculating the concentrated first feed solution stream 242, or a portion thereof, to the first side 221 of the semipermeable membrane 215. The process may further include recirculating at least a portion of the concentrated first feed solution stream 242 to the second side 226 of the semipermeable membrane 215.

In at least some instances, the process further includes providing a second module 251 fluidically coupled with the first module 250 and a fourth feed solution source 263. The second module 251 includes a first chamber 232 and a second chamber 237. The second module 251 further includes a semipermeable membrane 216 disposed at the interface between the first chamber 232 and the second chamber 237. The semipermeable membrane 216 includes a first side 222 in fluidic communication with the first chamber 232 and a second side 227 in fluidic communication with the second chamber 237. The process further includes introducing, from the first chamber 231 of the first module 250, a third feed solution stream 242 to the first chamber 232 of the second module 251. The third feed solution stream 242 may include at least a portion of the concentrated first feed solution stream. The process further includes introducing, from the fourth feed solution source 263, a fourth feed solution stream 247 to the second chamber 237 of the second module 251 and on the second side 227 of the semipermeable membrane 216. The osmotic pressure of the third feed solution stream 242 is greater than or equal to the osmotic pressure of the fourth feed solution stream 247. The process further includes exerting hydrostatic pressure on the first side 222 of the semipermeable membrane 216 of the second module 251 such that solvent passes from the first side 222 of the semipermeable membrane 216 to the second side 227 of the semipermeable membrane 216 thereby producing a concentrated third feed solution stream 243 in the first chamber 232 of the second module 251 and a diluted fourth feed solution stream 272 in the second chamber 237 of the second module 251.

The fourth feed source 263 may be a high pressure pump or may be the first chamber 231 of the first module 250. In such cases, the fourth feed solution stream 247 may include at least a portion of the concentrated feed solution stream 242 from the first chamber 231 of the first module 250.

In addition to providing processes for concentrating a solution, the present disclosure further provides processes for purifying a solvent from a solute solution. For example, the OsARO modules depicted in FIGS. 1 and 2, and described above, may be combined with a reverse osmosis (RO) component and a forward osmosis (FO) component to produce a purified solvent product, such as water permeate. More particularly, the process for purifying a solvent may include providing a forward osmosis (FO) component fluidically coupled with a reverse osmosis (RO) component and a module. The module may include a first chamber fluidically coupled with the RO component and the FO component, as well as a second chamber fluidically coupled with the RO component. The module may further include a semipermeable membrane disposed at the interface between the first chamber and the second chamber. The semipermeable membrane may include a first side in fluidic communication with the first chamber and a second side in fluidic communication with the second chamber.

The process further includes introducing a contaminated FO feed solution to the FO component. The contaminated FO feed solution includes a solvent contaminated with one or more solutes. The process further includes causing the FO component to produce a concentrated FO feed solution stream and a diluted draw solution from the contaminated FO feed solution stream. The process may further include introducing the diluted draw solution to the RO component to form at least a portion of a RO feed solution stream. The process can further include causing the RO component to produce a permeate solution and a concentrated RO feed solution stream from the RO feed solution stream. The permeate solution includes a purified solvent recovered according to the process.

The process may further include introducing from the RO component a first feed solution stream to the first chamber of the module and onto the first side of the semipermeable membrane. The first feed solution stream includes at least a portion of the concentrated RO feed solution stream. The process may also include introducing from the RO component a second feed solution stream to the second chamber of the module and onto the second side of the semipermeable membrane. The second feed solution also includes at least a portion of the concentrated RO feed solution stream. The osmotic pressure of the first feed solution stream may be approximately equal to the osmotic pressure of the second feed solution stream. Alternatively, the osmotic pressure of the first feed solution stream may be greater than the osmotic pressure of the second feed solution stream.

The process may further include exerting hydrostatic pressure on the first side of the semipermeable membrane such that solvent passes from the first side of the semipermeable membrane to the second side of the semipermeable membrane thereby producing a concentrated first feed solution stream in the first chamber and a diluted second feed solution stream in the second chamber. The process may also include introducing from the second chamber of the module at least a portion of the diluted second feed solution stream to the RO component to be used as at least a portion of the RO feed solution stream. The process may further include introducing from the first chamber of the module at least a portion of the concentrated first feed solution stream to the FO component to form at least a portion of the draw solution.

FIGS. 3A-E illustrates the differences between the presently disclosed OsARO apparatus and technique to the conventional techniques of reverse osmosis (RO), forward osmosis (FO), pressure retarded osmosis (PRO), and pressure assisted forward osmosis (PAFO) processes. The OsARO process differs from RO, FO, PRO, and PAFO processes used in the art. As shown in FIGS. 3A-E, each of these processes uses a semipermeable membrane to separate one or more solutes from a solution.

The above referenced conventional processes can be divided into two categories according to the direction of the permeate flow. In FO, PRO and PAFO, the permeate flows from low osmotic pressure mixture side ($\pi(C2)$) to the high osmotic pressure mixture side ($\pi(C1)$) of the semipermeable membrane. Generally, in an FO system, the hydraulic pressure applied on both sides of the membrane is equal. In a PRO system, feed 1 is introduced at hydraulic pressure P1 and an osmotic pressure $\pi(C1)$ that is higher than the hydraulic pressure P2, osmotic pressure $\pi(C2)$ of feed 2 to result in a permeate flow from feed 2 to feed 1. In a PAFO system, the hydraulic pressure P2 of feed 2 is higher than the hydraulic pressure P1 of the feed 1. While the osmotic pressure $\pi(C1)$ of feed 1 is higher than the osmotic pressure $\pi(C2)$ of feed 2 to result in a permeate flow from feed 2 to feed 1.

The degree of permeation can be calculated as a permeate flux $J_w$. Permeate flux is defined as the volume flowing through the membrane per unit area per unit time.

Conventional RO and OsARO are different than FO, PRO and PAFO. In an RO process, the permeate flows from the feed 1, having a higher hydraulic pressure P1 to feed 2 having a lower hydraulic pressure P2. In RO, the feed 2 initially has no solution (in most cases a pure solvent such as water) and therefore, has no initial solute concentration C2 or corresponding osmotic pressure $\pi(C2)$. In OsARO, the permeate flows from feed 1, having a higher osmotic pressure $\pi(C1)$, to feed 2, having a lower osmotic pressure $\pi(C2)$. In some instances, in OsARO, the concentrations C1 and C2 of feeds 1 and 2, respectively, are the same. The permeate flows from the feed 1 side to the feed 2 side of the semipermeable membrane solely due to a higher applied hydraulic pressure P1 of feed 1 than the applied hydraulic pressure P2 of feed 2.

The difference between conventional RO and OsARO is the origination of the low osmotic pressure mixture feed (C2). In an RO process, no feed 2 is introduced across the membrane; only the permeate flowing from feed 1 exists on the feed 2 side of the membrane. In contrast, in OsARO, a second feed having a concentration C2 is introduced into the stage independently, as demonstrated in FIGS. 1-3. This second feed, reduces the difference in osmotic pressure across the semipermeable membrane and thus decreases the hydrostatic pressure required to cause solvent to flow across the semipermeable membrane, thereby producing a concentrated feed solution and a diluted feed solution.

From above comparisons, it can be seen that the presently disclosed OsARO differ from previously known processes. Using the presently disclosed OsARO apparatus and techniques, concentrated feed 1 solutions and/or diluted feed 2 solutions can be obtained independently for various applications.

EXAMPLES

The following examples demonstrate various applications and effects of the use of OsARO modules to concentrate solutes in a solution and/or to purify a solvent. In these examples, a commercially available hollow fiber brackish water membrane having a surface area of 50 m$^2$ was used. Such a membrane allows for a maximum operating hydraulic pressure of 450 psi. Aqueous sodium chloride (NaCl) solutions were used as feeds 1 and 2 in Examples 1-3. The OsARO module was in a radial configuration with two sets of inlets and outlets, one inlet and one outlet on each side of the semipermeable membrane respectively for feed 1 and feed 2.

Example 1: Adjusting Concentration Difference for Low Salinity Feeds

A 57 g/l NaCl solution (0.98M) was introduced, at the same time, as feed 1 and feed 2 to opposing sides of the semipermeable membrane. The 57 g/l NaCl solution concentration is generally equivalent to the brine concentration that is generated by a conventional RO desalination process. A 200±5 psi hydraulic pressure was applied to feed 1 side, while hydraulic pressure applied to the Feed 2 was held at or below 5 psi. When the feed flow rates (grams solution per minute) of feed 1 and feed 2 were adjusted, the outlet concentration difference between feed 1 and 2, and permeate flux could be changed accordingly, as is summarized in Table 1.

TABLE 1

Adjusting outlet concentration difference at 57 g/l feeds condition

| Trial # | Feed 1 inlet flow g/min | Feed 2 inlet flow g/min | Outlet ΔC (C1 − C2) g/L | Flux Jw LMH |
|---|---|---|---|---|
| 1 | 151 | 217 | 15.7 | 0.03 |
| 2 | 1,125 | 727 | 9.5 | 0.09 |
| 3 | 1,178 | 1,167 | 8 | 0.10 |
| 4 | 2,714 | 1,184 | 7.1 | 0.12 |
| 5 | 2,766 | 1,895 | 5.6 | 0.13 |

Example 2: Adjusting Concentration Difference for High Salinity Feeds

A 180 g/l NaCl aqueous solution (3.08M) was introduced into an OsARO module as Feed 1 and feed 2 respectively.

Figure 4:
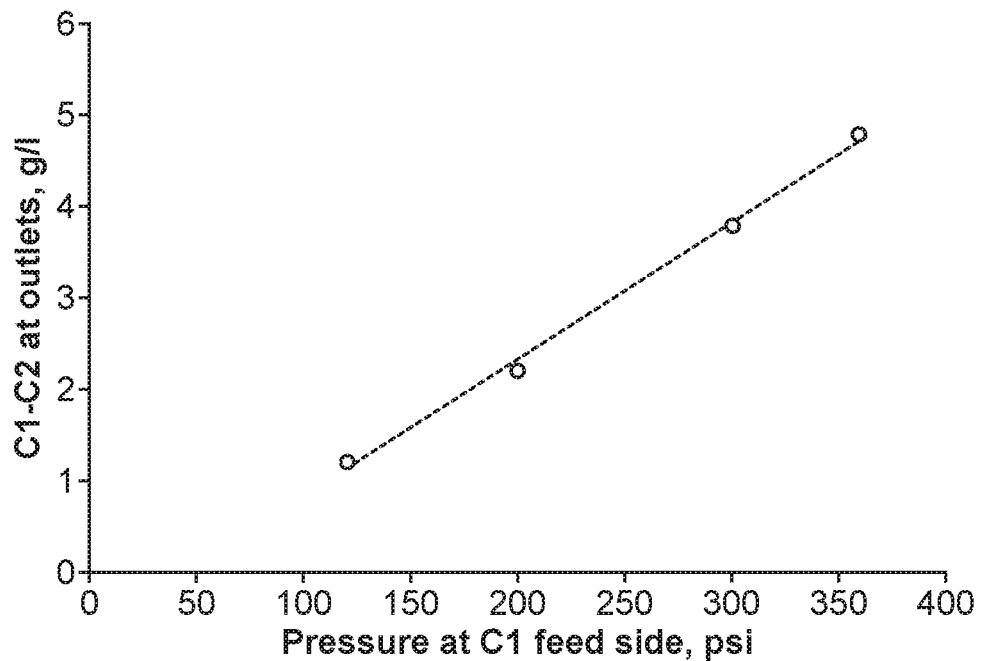
FIG. 4 is a graphical display of concentration change relative to the applied low pressure of a feed solution using a single stage osmotic pressure assisted reverse osmosis (OsARO) system, according to an example embodiment of the present disclosure.

The average hydraulic pressure of feed 2 was maintained below 20 psi while the hydraulic pressure on the feed 1 side was varied between 100 psi and 400 psi. The concentration difference between C1 and C2 at the outlet ports of the OsARO module is summarized in Table 2 and FIG. 4.

TABLE 2

Adjusting outlet concentration difference at 180 g/l feeds condition

| Trial # | Pressure at feed 1 side (psi) | ΔC = C1 − C2 at outlet, g/l |
|---|---|---|
| 1 | 120 | 1.2 |
| 2 | 200 | 2.2 |
| 3 | 300 | 3.8 |
| 4 | 360 | 4.8 |

According to the data presented in Table 2, when a 1,000 psi pressure is applied at C1 feed side, a theoretical concentration difference of 14 g/l is expected corresponding to a Feed 1 outlet concentration of 3.20 M and a feed 2 outlet concentration of 2.96 M.

Example 3: Adjusting Feed 1 Concentration

When a concentrated feed 1 is of interest, the operational parameters of an OsARO module, such as the applied hydraulic pressures of feed 1 and feed 2, concentration of feed 2, and the flow rate ratio of feeds 1 and 2, can be varied to achieve targeted concentrations of feed 1 at the outlet. In Example 3, both the feed 1 and feed 2 inlet concentrations of NaCl solutions were 53.80 (0.921 M). The applied hydraulic pressure to feed 1 was varied from 300 to 400 psi, while feed 2 was maintained under a pressure of less than 14.7 psi. Given a feed concentration C1 and C2, the hydraulic pressure of feed 1 and the cross flow velocities of feed 1 and 2 can be varied to yield a target concentration of feed 1 at the outlet. The results are listed in Table 3. As shown in Table 3, the targeted feed 1 outlet concentrations match well with the experimentally obtained results.

TABLE 3

Control of outlet concentration of feed 1.

| Applied Pressure, psi | Calculated C1 outlet, g/L ([M]) | Tested C1 outlet, g/L ([M]) | Water Flux, LMH |
|---|---|---|---|
| 400 | 64.5 (1.10) | 65.9 (1.13) | 0.26 |
| 350 | 62.5 (1.07) | 60.9 (1.03) | 0.22 |
| 300 | 58 (0.992) | 57.1 (0.977) | 0.21 |

The presently disclosed OsARO modules may be used in systems directed to zero-liquid discharge (ZLD) applications. Such systems have the ability to concentrate salt containing solutions to concentrations higher than that of traditional reverse osmosis systems. Systems incorporating the disclosed OsARO modules can also have the potential to concentrate a salt containing solution to near saturation. Subsequently, the concentrated salt containing solution can be further concentrated by an evaporation or crystallization process in ZLD applications. Examples 4-6 below illustrate high pressure OsARO module performance to achieve ultrahigh sea water desalination recovery without increasing the energy input. In these examples, a sea water RO type membrane having a surface area of 75 m² was used. Such a membrane allows for a maximum operating hydraulic pressure of 1200 psi.

Example 4: High Pressure Single OsARO Module Performance

Figure 5:
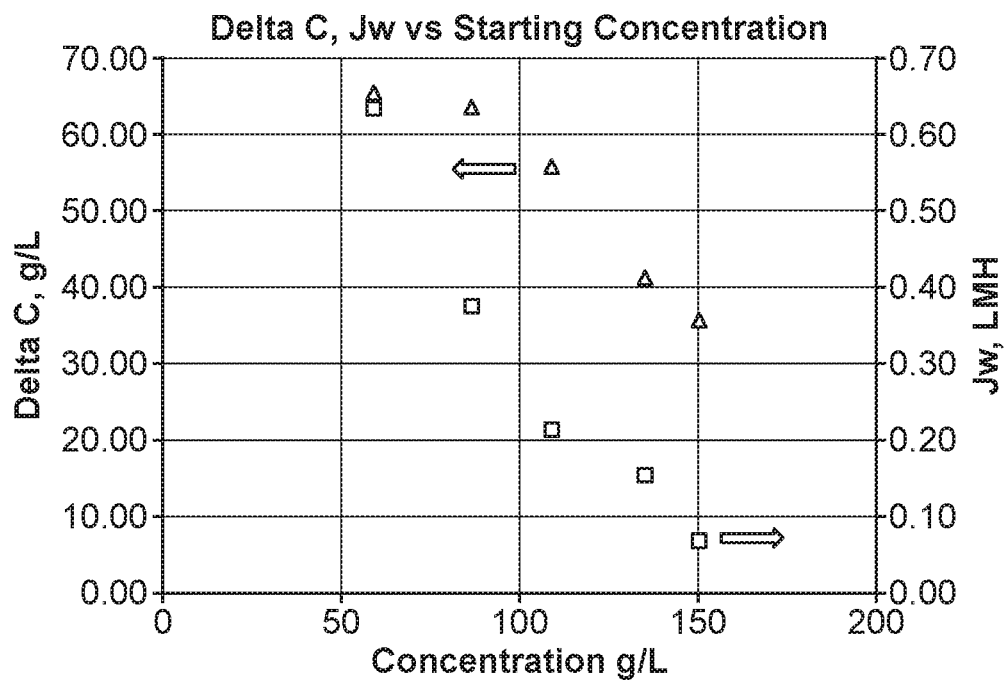
FIG. 5 is a graphical display of concentration change relative to the applied high pressure of a feed solution using a single stage osmotic pressure assisted reverse osmosis (OsARO) system, according to an example embodiment of the present disclosure.

Feed 1 and feed 2 having the same inlet concentrations of NaCl solutions were varied from 58 g/l to 150 g/l. The applied hydraulic pressure to feed 1 was varied from 750 to 800 psi, while feed 2 was maintained under pressure (<40 psi). Given a feed concentration C1 and C2, and the hydraulic pressure of feed 1, the cross flow velocities of feed 1 and 2 can be varied to yield a target concentration difference between feed 1 and feed 2 at the outlets. The results of water flux are also listed in Table 4 and FIG. 5.

TABLE 4

Outlets concentration difference and water flux results of high pressure OsARO

| Inlet feed C1 and C2, g/L | C1 outlet, g/L | C2 outlet, g/L | Water Flux, LMH |
|---|---|---|---|
| 59 | 86 | 20 | 0.64 |
| 86 | 109 | 45 | 0.38 |
| 110 | 135 | 79 | 0.21 |
| 135 | 150 | 109 | 0.15 |
| 150 | 166 | 130 | 0.07 |

Example 5: A FO-RO-OsARO System for Ultrahigh Recovery Sea Water Desalination (FIG. 6)

Figure 6:
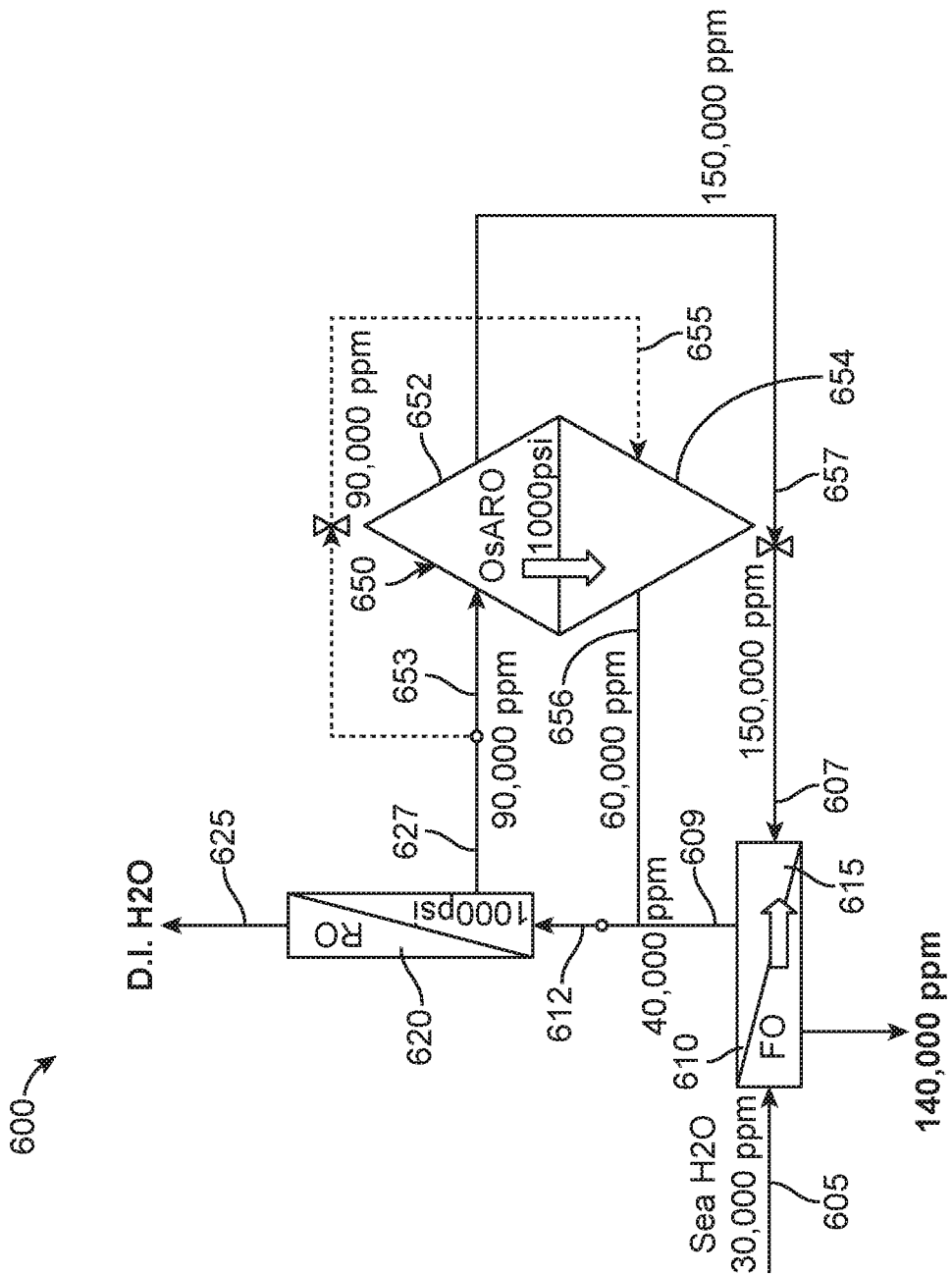
FIG. 6 is a diagram of an FO-RO-OsARO system, according to an example embodiment of the present disclosure.

In this example, seawater at 30,000 ppm NaCl was concentrated to 140,000 ppm using the system 600 depicted in FIG. 6. FIG. 6 depicts a FO-RO-OsARO system in which a sea water FO feed solution stream 605 is fed to an forward osmosis (FO) component 610 that uses, for example, a 150,000 ppm NaCl solution as the draw solution stream 607. Water permeates through the FO membrane 615 from the seawater side to the draw solution side, and the total dissolved solids (TDS) of the sea water FO feed solution stream 605 is concentrated to 140,000 ppm while the draw solution stream 607 is diluted to 40,000 ppm. This corresponds to a 78.6% FO recovery, which is much higher than 50% recovery for typical seawater RO. The produced 40,000 ppm diluted draw solution stream 609 is then transferred from the FO component 610 to a reverse osmosis (RO) component 620 to form at least a portion of a RO feed solution stream 612 at, for example, 1,000 psi to generate a purified solvent permeate 625 product (that is, de-ionized water) and to concomitantly concentrate the RO feed solution stream 612 to 90,000 ppm, thereby forming a concentrated RO feed solution stream 627. The 90,000 ppm concentrated RO feed solution stream 627 is then split and introduced into both the first chamber 652 and the second chamber 654 of the OsARO module 650, operated at, for example, 1,000 psi. The OsARO module 650 receives a first portion of the concentrated RO feed solution stream 627 into the first chamber 652 to form a first feed solution stream 653 and receives a second portion of the concentrated RO feed solution stream 627 into the second chamber 654 to form a second feed solution stream 655. In the first chamber 652, the first feed solution stream 653 is concentrated to 150,000 ppm to form a concentrated feed solution stream 657 that may be transferred to the FO component 610 to regenerate the 150,000 ppm draw solution 607. In the second chamber 654, the second feed solution stream 655 is diluted to 60,000 ppm to form a diluted second feed solution stream 656. The 60,000 ppm diluted second feed solution stream 656 is then sent to the RO component 620 to produce additional purified solvent product 625.

Figure 7:
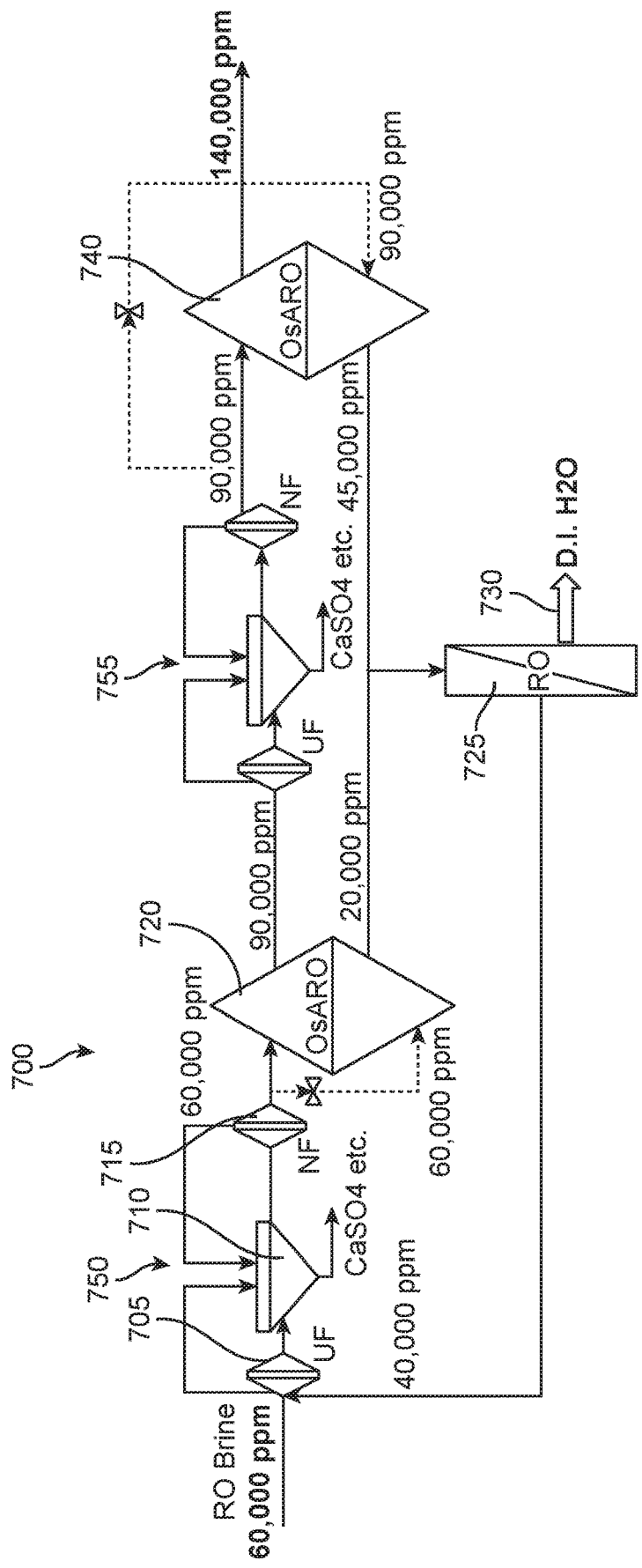
FIG. 7 is a diagram of an OsARO-RO system, according to an example embodiment of the present disclosure.

Example 6: A OsARO-RO System Enhancing Recovery of Existing Seawater Desalination RO Plant from Discharged Brine In this example, a 60,000 ppm brine from a seawater RO plan is concentrated to 140,000 ppm using an OsARO2-RO system, as shown in FIG. 7. As shown in FIG. 7, OsARO2-RO system 700 includes a pre-treatment system 750, 755 used in front of each OsARO module. The system 700 includes a UF filtration module 705, a solid-liquid separation device 710, such as seeding tank, vortex tank or modified hydro cyclone device, and a NF filtration. Brine is filtered by a UF membrane 705 first, and settled in a seeding tank or vortex tank 710 with sludge discharge, then the hardness is removed by a NF membrane. The pretreated brine is then split and fed to a first OsARO module 720, and operated at, for example, 1,000 psi. The feed stream in one chamber of the OsARO module 720 is concentrated to 90,000 ppm solution, while the feed stream in the other chamber of the OsARO module 720 is diluted to 20,000 ppm. The 20,000 ppm solution stream is sent to the RO component 725 to produce additional purified water product 730, while the generated RO brine at 60,000 ppm is fed back to the first pretreatment system 750. The 90,000 ppm solution generated by first OsARO module 720 is treated by a second pre-treatment system 755, and split and fed to second OsARO module 740. One chamber of the second OsARO module 740 generates 140,000 ppm discharge brine, while the feed stream in the other chamber is diluted to 45,000 ppm. This 45,000 ppm feed stream is also sent to the RO component 725 to generate additional water. As both of the diluted 20,000 ppm and 45,000 ppm streams from the OsARO modules 720, 740 are recycling inside, the discharged 140,000 ppm corresponds to an additional 28.6% recovery for the existing seawater RO plan (if calculated from seawater at 30,000 ppm).

In addition to the pretreatment systems 750, 755, described above, the incoming feed stream, such as seawater, brackish water, waste water, industrial water and or produced water, may need to be pretreated to prevent scaling, organic contamination and or biological fouling. Consequently, separately or in combination, all of the following pretreatment systems may be utilized as pretreatment for the presently disclosed apparatus and techniques: multimedia filtration, cartage filtration coagulation, chemical addition, centrifuging, microfiltration (MF), ultrafiltration UF), nano-filtration (UF), chemical seeding, UF/seeding, NF/seeding, UF/seeding/NF activated carbon adsorption, UF/Seeding-hydrocyclone/NF, ion exchange, capacitance deionization (CDI), electro deionization (EDI), Advanced Oxidation Process (AOP), and any combination thereof.

Examples 7-8 below illustrate FO-RO-OsARO systems used to regenerate FO draw solutions in ZLD applications.

Example 7: A FO-RO-OsARO System for Sea Water ZLD Desalination

Figure 8:
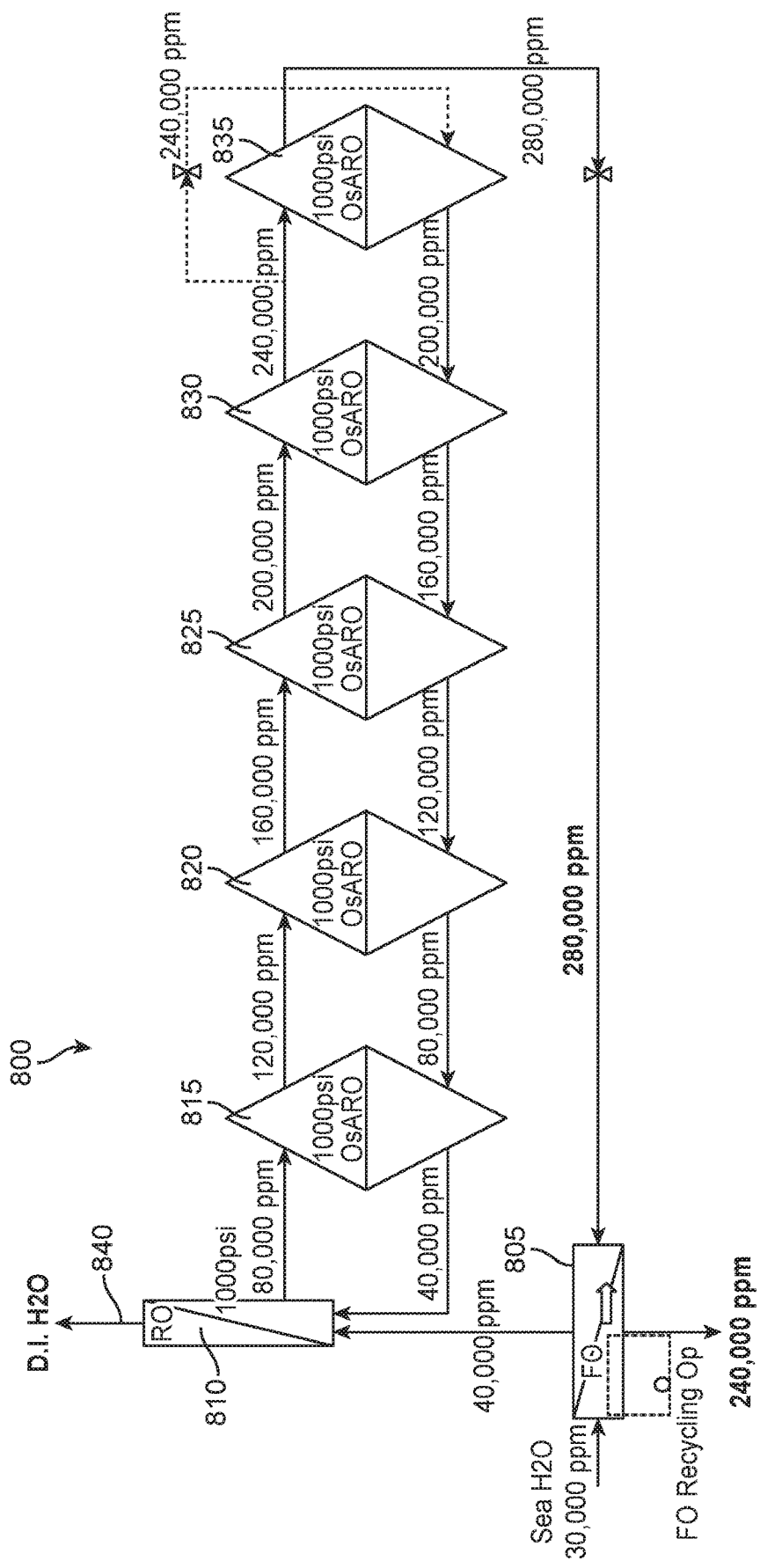
FIG. 8 is a diagram of an FO-RO-OsARO system, according to an example embodiment of the present disclosure.

In this seawater ZLD example, several OsARO modules are added to the previous Example 4 in series. As depicted in FIG. 8, the system 800 includes multiple OsARO modules or stages that allow the FO component 805 to be used with a stronger draw solution. In this example, seawater is concentrated from 30,000 ppm to 240,000 ppm, which corresponds to an 87.5% recovery. The FO component 805 can use, for example, a 280,000 ppm $MgCl_2$ draw solution. The diluted draw solution leaving the FO component 805 at 40,000 ppm is concentrated to 80,000 ppm by the RO component 810 at, for example, 1,000 psi. This 80,000 ppm solution then passes sequentially through five OsARO modules 815, 820, 825, 830, 835, or stages, each at, for example, 1,000 psi to regenerate the 280,000 ppm draw solution. Each OsARO stage concentrates the draw solution by roughly 40,000 ppm until the FO 280,000 ppm draw solution is regenerated. The RO component 810 generates a purified water product 840 (that is, de-ionized water), as previously described, and an 80,000 ppm solution for subsequent use in the first OsARO module 815. To help increase the water flux in the FO process, the seawater feed (and/or draw) can be operated in a recycling mode, in which a recycling pump is used to force the FO outlet solution going back to the inlet of FO membrane with highest velocity feasible to help reduce the concentration polarization, especially under high concentration conditions. Pre-treatment systems similar to pretreatment systems 750, 755 shown in FIG. 7 may be used in front of FO membranes in order to eliminate the fouling at high concentration.

Example 8: A FO-RO-OsARO System for Produced Oilfield Water ZLD Process

Figure 9:
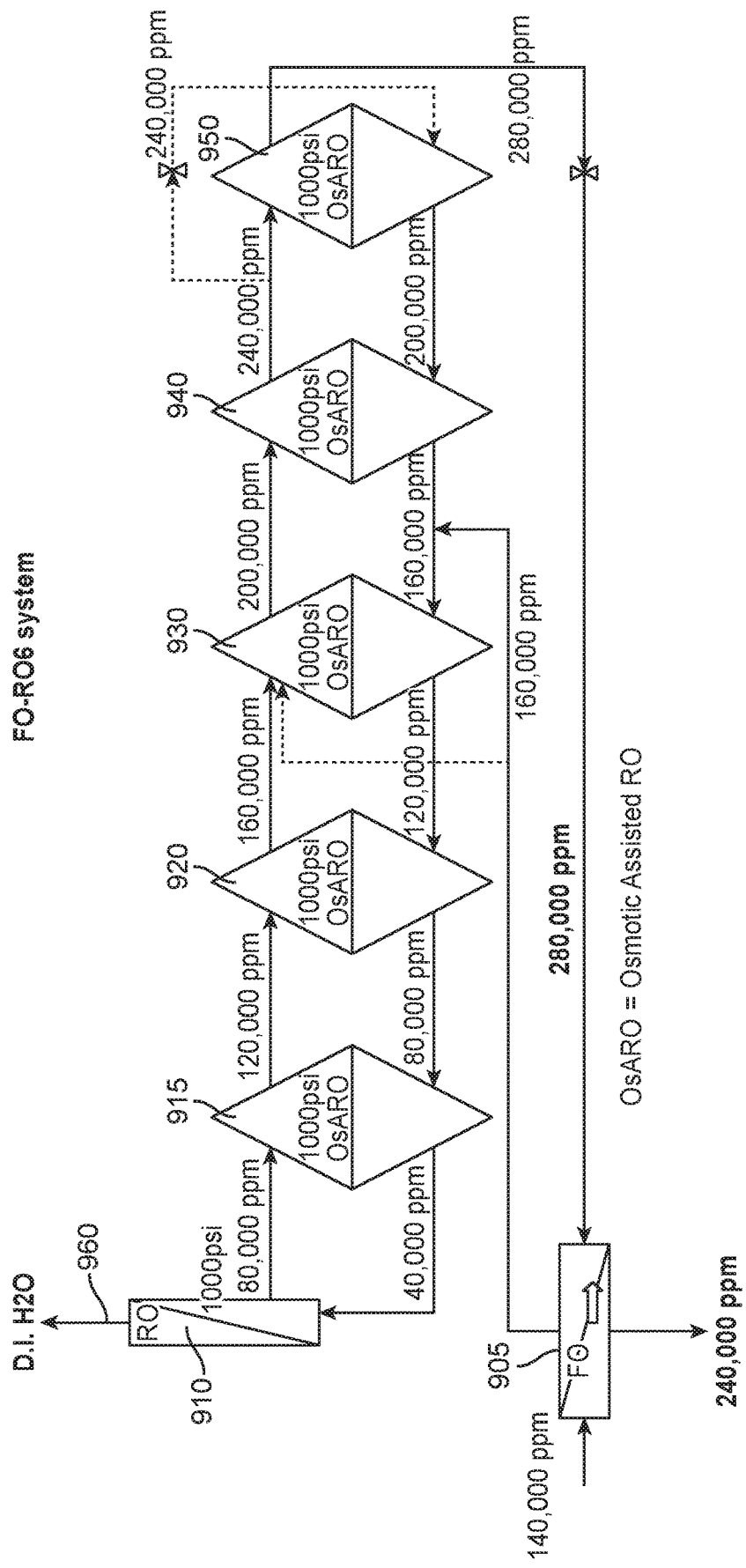
FIG. 9 is a diagram of another alternative FO-RO-OsARO system, according to an example embodiment of the present disclosure.

Example 8 uses a system similar to that described in Example 7 and shown in corresponding FIG. 8. As shown in FIG. 9, since the concentration of the feed solution is higher, at 140,000 ppm, the diluted draw solution leaves the FO component 905 at a higher concentration, around 160,000 ppm. This diluted draw solution is then sent directly to the 160,000 ppm third OsARO module 930, as shown in FIG. 9. One stream is sequentially concentrated to 280,000 ppm and reused as the draw solution for the FO component 905, while the other stream is sequentially diluted to 40,000 ppm and introduced into the RO component 910. The RO component 910 generates a purified water product 960 (that is, de-ionized water), as previously described and a 80,000 ppm solution for subsequent use in the first OsARO module 915.

Figure 10A:
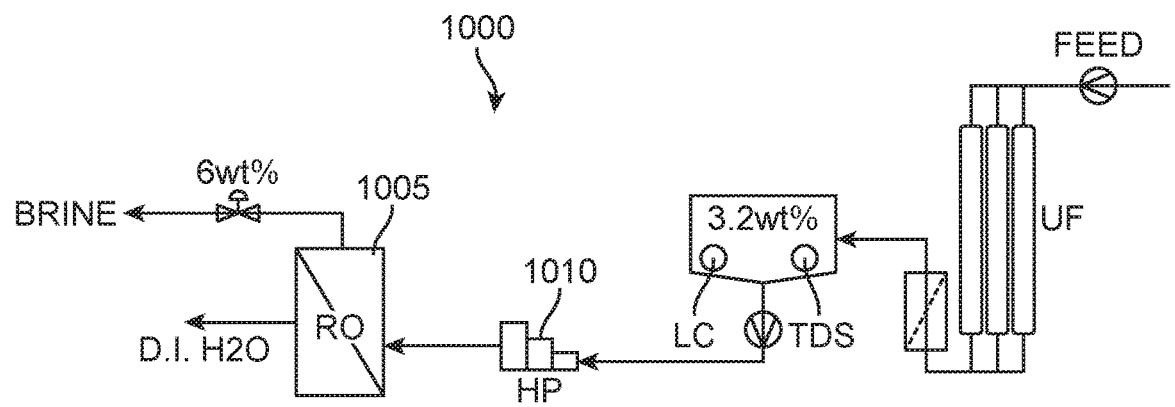
FIG. 10A is a diagram of an RO system in which a 3.2 weight % seawater feed is delivered to a membrane by a high pressure pump.
Figure 10B:
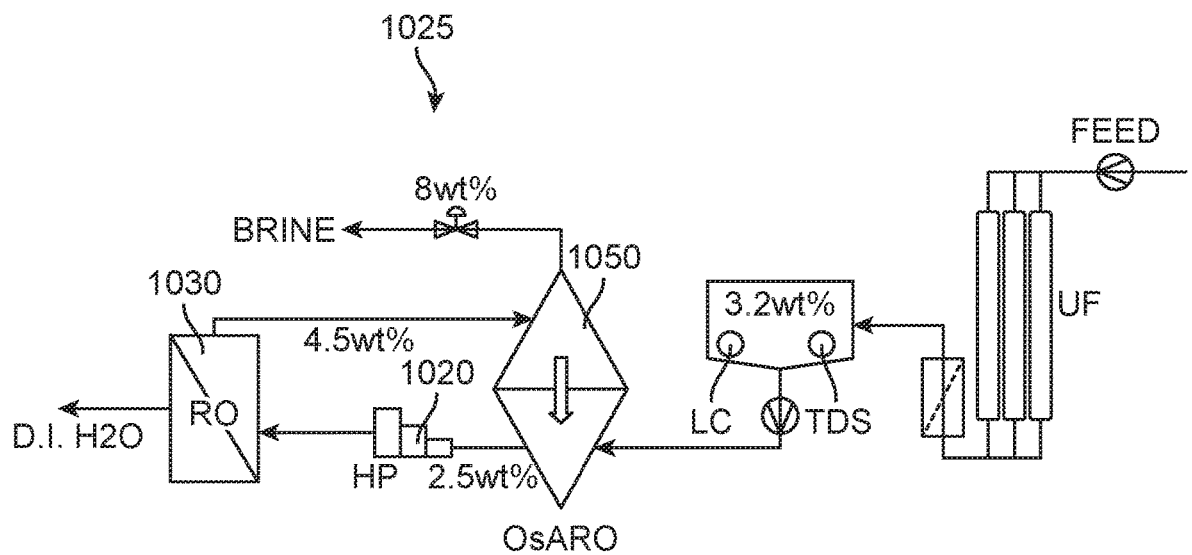
FIG. 10B is a diagram of the same RO system depicted in FIG. 10A but with an OsARO stage added in front of the high pressure pump, resulting in increased system efficiency, according to an example embodiment of the present disclosure.

Example 9: Adding a OsARO Module to Enhance Recovery in a Conventional RO System FIGS. 10A and 10B illustrate a recovery comparison in a conventional RO system with and without a OsARO module. FIG. 10A illustrates recovery for a conventional RO system 1000 used to desalinate seawater. As depicted in FIG. 10A, a 3.2 wt % seawater feed is delivered to a RO component 1005 by a high pressure pump 1010, yielding a concentrated stream of 6 wt %, corresponding to a 47% recovery. In contrast, as shown by system 1025 in FIG. 10B, when a OsARO module 1050 is added in front of the high pressure pump 1020, the low-pressure side (second chamber) of the OsARO module 1050 may be used for the seawater feed while the high-pressure side (first chamber) may be fed the brine from the RO component 1030 under high pressure. In such a configuration, even under the same RO operating pressures and seawater feed concentrations, the addition of the OsARO module 1050 causes the RO brine to provide additional permeate to cross the membrane in the OsARO module 1050 to the seawater feed. The brine is further concentrated and at the same time feed's concentration to the RO step is reduced. As a result, more permeate is obtained by the same RO component, and recovery is increased. As shown in FIGS. 10A and 10B, as a result of the addition of the OsARO module, the feed concentration can be reduced from 3.2 wt % to 2.5 wt % and the RO brine can be concentrated from 4.5 wt % to 8 wt %. Therefore, the recovery becomes 60%, indicating that an extra 13% recovery can be achieved in the same RO system without extra energy consumption of pretreatment of the feed.

Figure 11:
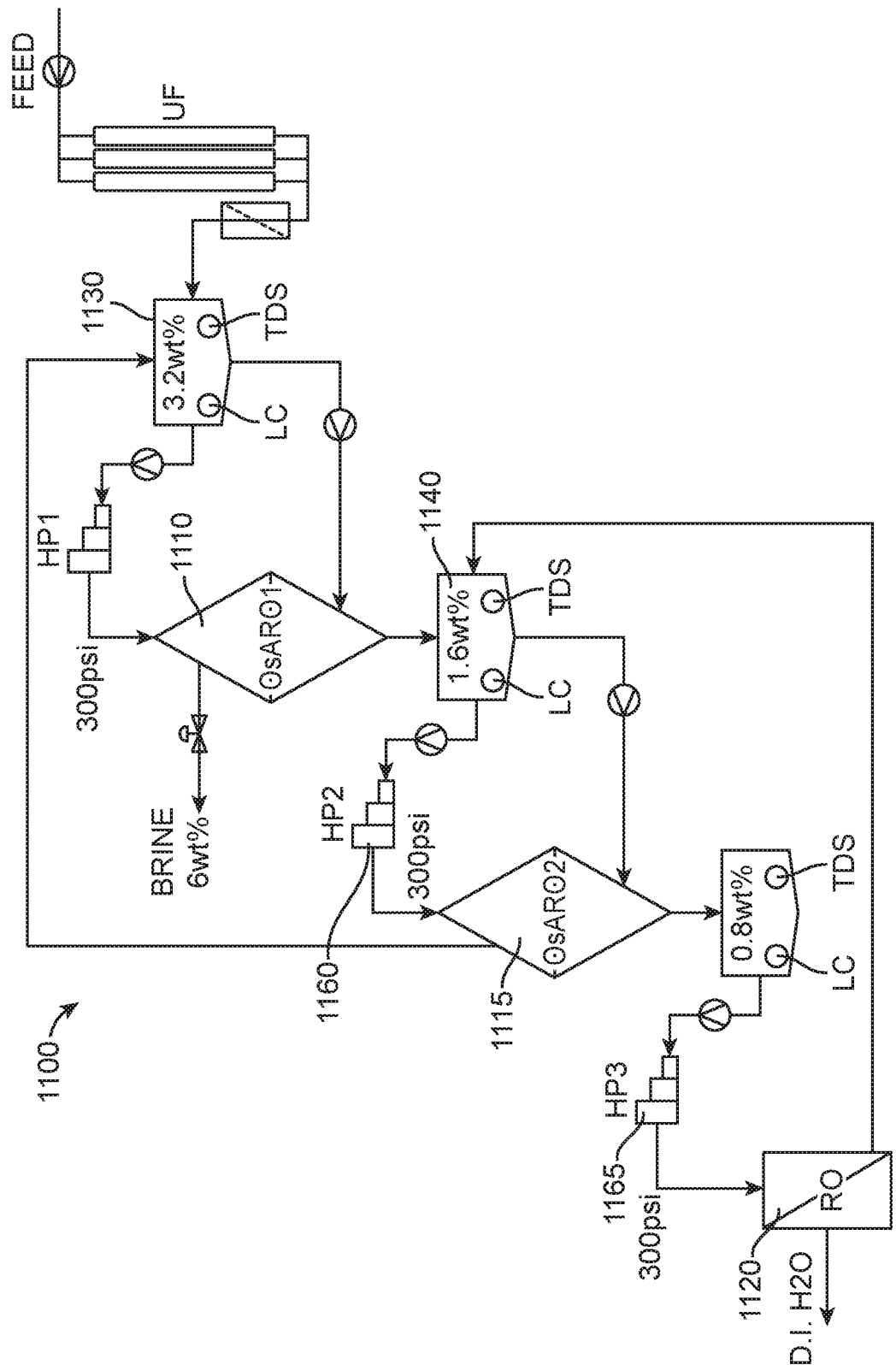
FIG. 11 is a diagram of an RO-OsARO system having reduced operating pressure due to the use of dilute seawater feed diluted by two OsARO stages, according to an example embodiment of the present disclosure.

Example 10: Operating Pressure in Seawater Desalination RO System is Reduced by Using a Dilute Feed from a OsARO Module FIG. 11 illustrates a system 1100 capable of 47% recovery in a seawater desalination at only 300 psi RO operating pressure due to the use of two OsARO modules. As depicted in FIG. 11, a 3.2 wt % seawater feed can be diluted to 1.6 wt % by a first OsARO module 1110 while the same module 1110 concentrates the seawater stream from 3.2 wt % to 6 wt % under only 300 psi pressure. The diluted 1.6 wt % stream can be further diluted by a second OsARO module 1115 to 0.8 wt % and fed to a RO component 1120. The concentrated stream from the second OsARO module can be adjusted to 3.2 wt % and fed back to the original seawater feed tank 1130. The RO brine can also be adjusted to 1.6 wt % and fed back to the middle 1.6 wt % break tank 1140. As the system 1100 produces 6 wt % brine and deionized water as outlet streams, this system 1100 provides a 47% recovery under 300 psi pressure. The same recovery in a conventional RO system normally requires 800 psi pressure. In addition, a pressure exchanger may be used to replace the high pressure pumps 1160, 1165 to further save energy. This example is not limited to two OsARO modules or stages. Any number of OsARO stages is within the scope and spirit of the present disclosure.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

Statements of the Disclosure Include:

Statement 1: An apparatus comprising: a first feed solution source; a second feed solution source; and a semipermeable membrane comprising a first side configured to receive a first feed solution stream from the first feed solution source and a second side configured to receive a second feed solution stream from the second feed solution source, the first feed solution stream having a first solute concentration and a first osmotic pressure, and the second feed solution stream having a second solute concentration and a second osmotic pressure, wherein the first osmotic pressure is greater than or equal to the second osmotic pressure; and wherein the first feed solution source is configured to provide hydrostatic pressure to the first side of the semipermeable membrane so as to produce a concentrated first feed solution stream and a diluted second feed solution stream by solvent passing, in the form of a permeate solution, from the first feed solution stream to the second feed solution stream via the semipermeable membrane.

Statement 2: An apparatus according to Statement 1, wherein the second feed solution source is configured to provide hydrostatic pressure to the second side of the semipermeable membrane, and wherein the hydrostatic pressure provided to the second side of the semipermeable membrane is less than the hydrostatic pressure provided to the first side of the semipermeable membrane by the first feed solution source.

Statement 3: An apparatus according to Statement 1, wherein the hydrostatic pressure is from about 50 psi to about 5,000 psi.

Statement 4: An apparatus according to Statement 2, wherein the hydrostatic pressure provided to the first side of the semipermeable membrane is from about 50 psi to about 5,000 psi and the hydrostatic pressure provided to the second side of the semipermeable membrane is from about 0 psi to about 500 psi.

Statement 5: An apparatus according to Statement 1, wherein the first feed solution source is configured to feed the first solution stream to the first side of the semipermeable membrane at a first hydrostatic pressure and the second feed solution source is configured to feed the second solution stream to the second side of the semipermeable membrane at a second hydrostatic pressure, wherein the first hydrostatic pressure is greater than the second hydrostatic pressure.

Statement 6: An apparatus according to Statement 5, wherein the first hydrostatic pressure is from about 50 psi to about 5,000 psi and the second hydrostatic pressure is from about 0 psi to about 500 psi.

Statement 7: An apparatus according to any one of the preceding Statements 1-6, wherein the first solute concentration is greater than or equal to the second solute concentration.

Statement 8: An apparatus according to any one of the preceding Statements 1-6, wherein the first solute concentration is approximately equal to the second solute concentration.

Statement 9: An apparatus according to any one of the preceding Statements 1-8, wherein the second solute concentration is greater than about 500 ppm.

Statement 10: An apparatus according to any one of the preceding Statements 1-9, wherein the second feed solution stream comprises a flow rate of between about 200 grams solute per minute and about 2000 grams solute per minute.

Statement 11: An apparatus according to any one of the preceding Statements 1-10, wherein the ratio of the first osmotic pressure to the second osmotic pressure is from about 1 to about 5.

Statement 12: An apparatus according to any one of the preceding Statements 1-11, wherein the first osmotic pressure is approximately equal to the second osmotic pressure.

Statement 13: An apparatus according to any one of the preceding Statements 1-12, wherein the second osmotic pressure is sufficient to reduce the hydrostatic pressure required to produce a concentrated first feed solution stream and a diluted second feed solution stream by solvent passing from the first feed solution stream to the second feed solution stream via the semipermeable membrane.

Statement 14: An apparatus according to any one of the preceding Statements 1-13, wherein the first feed solution stream comprises a first solute and a first solvent and the second feed solution stream comprises a second solute and a second solvent, and at least the second solvent is selected from the group consisting of water, methanol, ethanol, and any combination thereof.

Statement 15: An apparatus according to Statement 14, wherein at least the second solvent is water.

Statement 16: An apparatus according to Statement 15, wherein the second solute is selected from the group consisting of alcohols, dioxane, acetone, tetrahydrofuran (THF), dimethyl formamide (DMF), and dimethyl sulfoxide (DMSO).

Statement 17: An apparatus according to Statement 14, wherein the second solute is selected from the group consisting of sodium chloride (NaCl), potassium chloride (KCl), magnesium chloride ($MgCl_2$), magnesium carbonate ($MgCO_3$), magnesium sulfate ($MgSO_4$), calcium chloride ($CaCl_2$), calcium sulfate ($CaSO_4$), calcium carbonate ($CaCO_3$), potassium acetate (KAc), and calcium magnesium acetate (CaMgAc).

Statement 18: An apparatus according to Statement 14, wherein the second solute is selected from sugar, ethylene oxide (EO), propylene oxide (PO), polyethylene glycols (PEG), poly(acrylic acid), poly(vinyl alcohol) poly(ethylene oxide), poly(vinyl acid), poly(styrenesulfonate), poly(acrylamide)-based polyelectrolytes, poly(diallyldimethylammonium chloride), poly(allylamine hydrochloride), poly(vinylpyrrolidone), poly(N-isopropylacrylamide), poly(alkylacrylates), polyalkylacrylic acids, poly(2-oxazoline) and polyethylenimine, copolymers or block copolymers thereof, and any combination thereof.

Statement 19: An apparatus according to any one of the preceding Statements 1-18, wherein the first feed solution source is selected from the group consisting of a high pressure pump, a reverse osmosis system, a forward osmosis system, an OsARO module, and any combination thereof.

Statement 20: An apparatus according to any one of the preceding Statements 1-19, wherein the second feed solution source is selected from the group consisting of a pump, a reverse osmosis system, an OsARO module, and any combination thereof.

Statement 21: An apparatus according to any one of the preceding Statements 1-20, wherein the second feed solution stream is a constant flow solute stream.

Statement 22: An apparatus according to any one of the preceding Statements 1-21, wherein the permeate solution has a third osmotic pressure, the second osmotic pressure being greater than the third osmotic pressure.

Statement 23: An apparatus according to any one of the preceding Statements 1-22, wherein the first feed solution source and the second feed solution source are configured to generate a pressure differential between the first hydrostatic pressure and the second hydrostatic pressure sufficient to cause solvent to pass from the first side to the second side of the semipermeable membrane, wherein the first feed solution source and the second feed solution source are further configured to vary the pressure differential as a function of the second osmotic pressure.

Statement 24: An apparatus according to any one of the preceding Statements 1-23, wherein the first feed solution stream comprises a contaminated solution, the second feed solution stream comprising at least a portion of the contaminated solution.

Statement 25: An apparatus according to any one of the preceding Statements 1-24, wherein the first feed solution source and the second feed solution source are each configured to provide portions of the same contaminated solution to a respective one of the first and second sides of the semipermeable membrane.

Statement 26: An apparatus according to any one of the preceding Statements 1-25, wherein the first feed solution source is further configured to recirculate the concentrated first feed solution stream, or a portion thereof, to the first side of the semipermeable membrane.

Statement 27: An apparatus according to any one of the preceding Statements 1-26, wherein the second feed solution source is configured to provide at least a portion of the concentrated first feed solution stream to the second side of the semipermeable membrane.

Statement 28: An apparatus comprising: a first feed solution source; a second feed solution source; and at least one module fluidically coupled with the first feed solution source and the second feed solution source, the at least one module comprising: a first chamber and a second chamber; a semipermeable membrane disposed at the interface between the first chamber and the second chamber, the semipermeable membrane having a first side in fluidic communication with the first chamber and a second side in fluidic communication with the second chamber; wherein the first chamber is configured to receive a first feed solution stream from the first feed solution source and the second chamber is configured to receive a second feed solution stream from the second feed solution source, the first feed solution stream having a first solute concentration and a first osmotic pressure, and the second solution stream having a second solute concentration and a second osmotic pressure, wherein the first osmotic pressure is greater than or equal to the second osmotic pressure; and wherein the first feed solution source is configured to provide hydrostatic pressure to the first chamber so as to produce a concentrated first feed solution stream and a diluted second feed solution stream by solvent passing from the first chamber to the second chamber via the semipermeable membrane.

Statement 29: An apparatus according to Statement 28, further comprising a forward osmosis (FO) component and a reverse osmosis (RO) component, each component fluidically coupled with the at least one module.

Statement 30: An apparatus according to Statement 28 or Statement 29, wherein the first chamber comprises a first inlet port configured to receive the first feed solution stream from the first feed solution source and the second chamber comprises a second inlet port configured to receive the second feed solution stream from the second feed solution source.

Statement 31: An apparatus according to any one of the Statements 28-30, wherein the first feed solution source comprises a reverse osmosis (RO) component, the RO component producing a permeate solution and a concentrated RO feed solution stream from a RO feed solution stream, wherein the first feed solution stream comprises at least a portion of the concentrated RO feed solution stream.

Statement 32: An apparatus according to any one of the Statement 31, wherein the second feed solution source comprises the RO component, the second solution stream comprising at least a portion of the concentrated RO feed solution stream.

Statement 33: An apparatus according to any one of the preceding Statements 29-32, wherein the second chamber is configured to transfer at least a portion of the diluted second feed solution stream to the RO component, the RO component configured to receive the at least a portion of the diluted second feed solution stream from the second chamber, the RO feed solution stream comprising at least in part the diluted second feed solution stream.

Statement 34: An apparatus according to Statement 28, further comprising a forward osmosis (FO) component fluidically coupled with the RO component and the at least one module, the FO component configured to produce a diluted draw solution and a concentrated feed solution from a draw solution and a FO feed solution stream, wherein the first chamber of the at least one module is configured to transfer the produced concentrated first feed solution stream to the FO component, the FO component configured to receive the concentrated first feed solution stream from the first chamber of the at least one module and use at least a portion of the concentrated first feed solution stream as the draw solution.

Statement 35: An apparatus according to Statement 34, wherein the FO component is configured to transfer the diluted draw solution stream to the RO component, the RO component configured to receive the diluted draw solution stream from the FO component and use at least a portion of the diluted draw solution stream as the RO feed solution stream.

Statement 36: An apparatus according to any one of the preceding Statements 28-35, wherein the second feed solution source is configured to provide hydrostatic pressure to the second side of the semipermeable membrane, and wherein the hydrostatic pressure provided to the second side of the semipermeable membrane is less than the hydrostatic pressure provided to the first side of the semipermeable membrane by the first feed solution source.

Statement 37: An apparatus according to any one of the preceding Statements 28-35, wherein the hydrostatic pressure is from about 50 psi to about 5,000 psi.

Statement 38: An apparatus according to Statement 36, wherein the hydrostatic pressure provided to the first side of the semipermeable membrane is from about 50 psi to about 5,000 psi and the hydrostatic pressure provided to the second side of the semipermeable membrane is from about 0 psi to about 500 psi.

Statement 39: An apparatus according to any one of the preceding Statements 28-35, wherein the first feed solution source is configured to feed the first solution stream to the first side of the semipermeable membrane at a first hydrostatic pressure and the second feed solution source is configured to feed the second solution stream to the second side of the semipermeable membrane at a second hydrostatic pressure, wherein the first hydrostatic pressure is greater than the second hydrostatic pressure.

Statement 40: An apparatus according to Statement 39, wherein the first hydrostatic pressure is from about 50 psi to about 5,000 psi and the second hydrostatic pressure is from about 0 psi to about 500 psi.

Statement 41: An apparatus according to any one of the preceding Statements 28-40, wherein the first solute concentration is greater than or equal to the second solute concentration.

Statement 42: An apparatus according to any one of the preceding Statements 28-40, wherein the first solute concentration is approximately equal to the second solute concentration.

Statement 43: An apparatus according to any one of the preceding Statements 28-42, wherein the second solute concentration is greater than about 500 ppm.

Statement 44: An apparatus according to any one of the preceding Statements 28-43, wherein the second feed solution stream comprises a flow rate of between about 200 grams solute per minute and about 2000 grams solute per minute.

Statement 45: An apparatus according to any one of the preceding Statements 28-44, wherein the ratio of the first osmotic pressure to the second osmotic pressure is from about 1 to about 5.

Statement 46: An apparatus according to any one of the preceding Statements 28-45, wherein the first osmotic pressure is approximately equal to the second osmotic pressure.

Statement 47: An apparatus according to any one of the preceding Statements 28-46, wherein the second osmotic pressure is sufficient to reduce the hydrostatic pressure required to produce a concentrated first feed solution stream and a diluted second feed solution stream by solvent passing from the first feed solution stream to the second feed solution stream via the semipermeable membrane.

Statement 48: An apparatus according to any one of the preceding Statements 28-47, wherein the first feed solution stream comprises a first solute and a first solvent and the second feed solution stream comprises a second solute and a second solvent, and at least the second solvent is selected from the group consisting of water, methanol, ethanol, and any combination thereof.

Statement 49: An apparatus according to Statement 48, wherein at least the second solvent is water.

Statement 50: An apparatus according to Statement 49, wherein the second solute is selected from the group consisting of alcohols, dioxane, acetone, tetrahydrofuran (THF), dimethyl formamide (DMF), and dimethyl sulfoxide (DMSO).

Statement 51: An apparatus according to Statement 48, wherein the second solute is selected from the group consisting of sodium chloride (NaCl), potassium chloride (KCl), magnesium chloride ($MgCl_2$), magnesium carbonate ($MgCO_3$), magnesium sulfate ($MgSO_4$), calcium chloride ($CaCl_2$), calcium sulfate ($CaSO_4$), calcium carbonate ($CaCO_3$), potassium acetate (KAc), and calcium magnesium acetate (CaMgAc).

Statement 52: An apparatus according to Statement 48, wherein the second solute is selected from sugar, ethylene oxide (EO), propylene oxide (PO), polyethylene glycols (PEG), poly(acrylic acid), poly(vinyl alcohol) poly(ethylene oxide), poly(vinyl acid), poly(styrenesulfonate), poly(acrylamide)-based polyelectrolytes, poly(diallyldimethylammonium chloride), poly(allylamine hydrochloride), poly(vinylpyrrolidone), poly(N-isopropylacrylamide), poly(alkylacrylates), polyalkylacrylic acids, poly(2-oxazoline) and polyethylenimine, copolymers or block copolymers thereof, and any combination thereof.

Statement 53: An apparatus according to any one of the preceding Statements 28-52, wherein the first feed solution source is selected from the group consisting of a high pressure pump, a reverse osmosis system, a forward osmosis system, an OsARO module, and any combination thereof.

Statement 54: An apparatus according to any one of the preceding Statements 28-53, wherein the second feed solution source is selected from the group consisting of a pump, a reverse osmosis system, an OsARO module, and any combination thereof.

Statement 55: An apparatus according to any one of the preceding Statements 28-54, wherein the second feed solution stream is a constant flow solute stream.

Statement 56: A process for concentrating a solute in a contaminated solution comprising solvent and solute, the process comprising: providing a semipermeable membrane having a first side and a second side; introducing a first feed solution stream on the first side of the semipermeable membrane, the first feed solution stream having a first solute concentration and a first osmotic pressure; introducing a second feed solution stream on the second side of the semipermeable membrane, the second feed solution stream having a second solute concentration and a second osmotic pressure, wherein the first osmotic pressure is greater than or equal to the second osmotic pressure; exerting hydrostatic pressure on the first side of the semipermeable membrane such that solvent passes from the first side of the semipermeable membrane to the second side of the semipermeable membrane thereby producing a concentrated first feed solution stream and a diluted second feed solution stream.

Statement 57: A process according to Statement 56, wherein exerting hydrostatic pressure on the first side of the semipermeable membrane comprises delivering, via a high pressure pump, the first feed solution to the first side of the semipermeable membrane to exert hydrostatic pressure on the first side of the semipermeable membrane.

Statement 58: A process according to Statement 56 or Statement 57, further comprising exerting hydrostatic pressure on the second side of the semipermeable membrane by delivering the second feed solution to the second side of the semipermeable membrane, wherein the hydrostatic pressure exerted on the second side of the semipermeable membrane is less than the hydrostatic pressure exerted on the first side of the semipermeable membrane.

Statement 59: A process according to any one of the preceding Statements 56-58, wherein exerting hydrostatic pressure on the first side of the semipermeable membrane comprises from about 50 psi to about 5,000 psi.

Statement 60: A process according to Statement 58 or Statement 59, wherein the hydrostatic pressure exerted on the first side of the semipermeable membrane is from about 50 psi to about 5,000 psi and the hydrostatic pressure exerted on the second side of the semipermeable membrane is from about 0 psi to about 500 psi.

Statement 61: A process according to any one of the preceding Statements 56-60, wherein the first solute concentration is greater than or equal to the second solute concentration.

Statement 62: A process according to any one of the preceding Statements 56-61, wherein the first solute concentration is approximately equal to the second solute concentration.

Statement 63: A process according to any one of the preceding Statements 56-62, wherein the second solute concentration is greater than about 500 ppm.

Statement 64: A process according to any one of the preceding Statements 56-63, wherein the second feed solution stream comprises a flow rate of between about 200 grams solute per minute and about 2000 grams solute per minute.

Statement 65: A process according to any one of the preceding Statements 56-64, wherein the ratio of the first osmotic pressure to the second osmotic pressure is from about 1 to about 5.

Statement 66: A process according to any one of the preceding Statements 56-65, wherein the first osmotic pressure is approximately equal to the second osmotic pressure.

Statement 67: A process according to any one of the preceding Statements 56-66, wherein the second osmotic pressure is sufficient to reduce the hydrostatic pressure required to produce a concentrated first feed solution stream and a diluted second feed solution stream by solvent passing from the first feed solution stream to the second feed solution stream via the semipermeable membrane.

Statement 68: A process according to any one of the preceding Statements 56-67, wherein the first feed solution stream comprises a first solute and a first solvent and the second feed solution stream comprises a second solute and a second solvent, and at least the second solvent is selected from the group consisting of water, methanol, ethanol, and any combination thereof.

Statement 69: A process according to Statement 68, wherein at least the second solvent is water.

Statement 70: A process according to Statement 69, wherein the second solute is selected from the group consisting of alcohols, dioxane, acetone, tetrahydrofuran (THF), dimethyl formamide (DMF), dimethyl sulfoxide (DMSO), and any combination thereof.

Statement 71: A process according to Statement 68, wherein the second solute is selected from the group consisting of sodium chloride (NaCl), potassium chloride (KCl), magnesium chloride ($MgCl_2$), magnesium carbonate ($MgCO_3$), magnesium sulfate ($MgSO_4$), calcium chloride ($CaCl_2$), calcium sulfate ($CaSO_4$), calcium carbonate ($CaCO_3$), potassium acetate (KAc), calcium magnesium acetate (CaMgAc), and any combination thereof.

Statement 72: A process according to Statement 68, wherein the second solute is selected from sugar, ethylene oxide (EO), propylene oxide (PO), polyethylene glycols (PEG), poly(acrylic acid), poly(vinyl alcohol) poly(ethylene oxide), poly(vinyl acid), poly(styrenesulfonate), poly(acrylamide)-based polyelectrolytes, poly(diallyldimethylammonium chloride), poly(allylamine hydrochloride), poly(vinylpyrrolidone), poly(N-isopropylacrylamide), poly(alkylacrylates), polyalkylacrylic acids, poly(2-oxazoline) and polyethylenimine, copolymers or block copolymers thereof, and any combination thereof.

Statement 73: A process according to any of the preceding Statements 56-72, wherein introducing the second feed solution stream on the second side of the semipermeable membrane comprises continuously flowing the second feed solution stream on the second side of the semipermeable membrane.

Statement 74: A process according to any one of the preceding Statements 56-73, wherein introducing the first feed solution stream on the first side of the semipermeable membrane comprises flowing the first feed solution stream from a high pressure pump.

Statement 75: A process according to any one of the preceding Statements 56-74, further comprising feeding the concentrated first feed solution to a forward osmosis (FO) component to be used as the draw solution by the FO component.

Statement 76: A process according to any one of the preceding Statements 56-75, further comprising using the concentrated first feed solution to regenerate the draw solution at a FO component.

Statement 77: A process according to any one of the preceding Statements 56-76, further comprising selecting the second osmotic pressure so as to reduce the hydrostatic pressure.

Statement 78: A process according to any one of the preceding Statements 56-76, wherein the second osmotic pressure is a predetermined osmotic pressure selected to reduce the hydrostatic pressure necessary to cause the solvent to pass from the first side to the second side of the semipermeable membrane.

Statement 79: A process according to any one of the preceding Statements 56-78, wherein the permeate solution has a third osmotic pressure, the second osmotic pressure being greater than the third osmotic pressure.

Statement 80: A process according to any one of the preceding Statements 56-79, further comprising selecting the second osmotic pressure to be greater than the osmotic pressure of the permeate solution so as to reduce the hydrostatic pressure.

Statement 81: A process according to any one of the preceding Statements 56-80, wherein both the first feed solution stream and the second feed solution stream comprise at least a portion of the same contaminated solution.

Statement 82: A process according to any one of the preceding Statements 56-81, further comprising recirculating the concentrated first feed solution stream, or a portion thereof, to the first side of the semipermeable membrane.

Statement 83: A process according to any one of the preceding Statements 56-82, further comprising recirculating at least a portion of the concentrated first feed solution stream to the second side of the semipermeable membrane.

Statement 84: A process for concentrating a solute in a solution that comprises solvent and solute, the process comprising: providing a first module fluidically coupled with a first feed solution source and a second feed solution source, the first module comprising: a first chamber and a second chamber; and a semipermeable membrane disposed at the interface between the first chamber and the second chamber, the semipermeable membrane having a first side in fluidic communication with the first chamber and a second side in fluidic communication with the second chamber; introducing, from the first feed solution source, a first feed solution stream to the first chamber and on the first side of the semipermeable membrane, the first feed solution stream having a first solute concentration and a first osmotic pressure; introducing, from the second feed solution source, a second feed solution stream to the second chamber and on the second side of the semipermeable membrane, the second feed solution stream having a second solute concentration and a second osmotic pressure, wherein the first osmotic pressure is greater than or equal to the second osmotic pressure; exerting hydrostatic pressure on the first side of the semipermeable membrane such that solvent passes from the first side of the semipermeable membrane to the second side of the semipermeable membrane thereby producing a concentrated first feed solution stream in the first chamber and a diluted second feed solution stream in the second chamber.

Statement 85: A process according to Statement 84, further comprising: providing a second module fluidically coupled with the first module and a fourth feed solution source, the second module comprising: a first chamber and a second chamber; and a semipermeable membrane disposed at the interface between the first chamber and the second chamber, the semipermeable membrane having a first side in fluidic communication with the first chamber and a second side in fluidic communication with the second chamber; introducing, from the first chamber of the first module, a third feed solution stream to the first chamber of the second module, the third feed solution stream comprising at least a portion of the concentrated first feed solution stream and having a third solute concentration and a third osmotic pressure; introducing, from the fourth feed solution source, a fourth feed solution stream to the second chamber of the second module and on the second side of the semipermeable membrane, the fourth feed solution stream having a fourth solute concentration and a fourth osmotic pressure, wherein the third osmotic pressure is greater than or equal to the fourth osmotic pressure; exerting hydrostatic pressure on the first side of the semipermeable membrane of the second module such that solvent passes from the first side of the semipermeable membrane to the second side of the semipermeable membrane thereby producing a concentrated third feed solution stream in the first chamber of the second module and a diluted fourth feed solution stream in the second chamber of the second module.

Statement 86: A process according to Statement 85, wherein the fourth solute concentration is greater than the second solute concentration.

Statement 87: A process according to Statement 86, wherein the fourth feed source comprises the first chamber of the first module, and the fourth feed solution stream comprises at least a portion of the concentrated first feed solution stream.

Statement 88: A process for purifying a solvent, the process comprising: providing a forward osmosis (FO) component fluidically coupled with a reverse osmosis (RO) component and a module, the module comprising: a first chamber, fluidically coupled with the RO component and the FO component, and a second chamber fluidically coupled with the RO component; and a semipermeable membrane disposed at the interface between the first chamber and the second chamber, the semipermeable membrane having a first side in fluidic communication with the first chamber and a second side in fluidic communication with the second chamber; introducing a contaminated FO feed solution stream to the FO component, the FO component having a draw solution, wherein the contaminated FO feed solution stream comprises a solvent contaminated with one or more solutes; causing the FO component to produce a concentrated FO feed solution stream and a diluted draw solution from the contaminated FO feed solution stream; introducing the diluted draw solution to the RO component to form at least a portion of a RO feed solution stream; causing the RO component to produce a permeate solution and a concentrated RO feed solution stream from the RO feed solution stream, the permeate solution comprising a purified solvent; introducing, from the RO component, a first feed solution stream to the first chamber of the module and on the first side of the semipermeable membrane, the first feed solution stream comprising at least a portion of the concentrated RO feed solution stream and having a first solute concentration and a first osmotic pressure; introducing, from the RO component, a second feed solution stream to the second chamber of the module and on the second side of the semipermeable membrane, the second feed solution stream comprising at least a portion of the concentrated RO feed solution stream and having a second solute concentration and a second osmotic pressure, wherein the first osmotic pressure is greater than or equal to the second osmotic pressure; exerting hydrostatic pressure on the first side of the semipermeable membrane such that solvent passes from the first side of the semipermeable membrane to the second side of the semipermeable membrane thereby producing a concentrated first feed solution stream in the first chamber and a diluted second feed solution stream in the second chamber; introducing, from the second chamber of the module, at least a portion of the diluted second feed solution stream to the RO component to form at least a portion of a RO feed solution stream; introducing, from the first chamber of the module, at least a portion of the concentrated first feed solution stream to the FO component to form at least a portion of the draw solution.

Statement 89: A system comprising: a first feed solution source; a second feed solution source; and at least one module, each module comprising: a first chamber and a second chamber; a semipermeable membrane disposed at the interface between the first chamber and the second chamber, the semipermeable membrane having a first side in fluidic communication with the first chamber and a second side in fluidic communication with the second chamber; wherein the first chamber is configured to receive a first feed solution stream from the first feed solution source and the second chamber is configured to receive a second feed solution stream from the second feed solution source, the first feed solution stream having a first solute concentration and a first osmotic pressure, and the second solution stream having a second solute concentration and a second osmotic pressure, wherein the first osmotic pressure is greater than or equal to the second osmotic pressure; and wherein the first feed solution source is configured to provide hydrostatic pressure to the first chamber so as to produce a concentrated first feed solution stream and a diluted second feed solution stream by solvent passing from the first chamber to the second chamber via the semipermeable membrane.

Statement 90: A system according to Statement 89, further comprising a plurality of modules, wherein the first chamber of each module is fluidically coupled with the first chamber of at least one other module.

Statement 91: A system according to Statement 89 or Statement 90, further comprising a first module and a second module, the first chamber of the first module fluidically coupled with the first chamber of the second module, and wherein the first chamber of the second module is configured to receive the concentrated first feed solution stream from the first chamber of the first module.

Statement 92: A system according to Statement 91, wherein the first chamber of the first module comprises a first inlet port configured to receive the first feed solution stream from the first feed solution source and a first exit port, and the first chamber of the second module comprises a second inlet port fluidically coupled to the first exit port, the second inlet port configured to receive the concentrated first feed solution stream from the first chamber of the first module.

Statement 93: A system according to Statement 92, wherein the second chamber of the second module is fluidically coupled with the second chamber of the first module, and wherein the second chamber of the second module is configured to receive the diluted second feed solution from the second chamber of the first module.

Statement 94: A system according to Statement 93, further comprising a forward osmosis (FO) component fluidically coupled with at least the second chamber of the second module, the FO component configured to produce a diluted draw solution and a concentrated feed solution from a draw solution and a FO feed solution stream, wherein the second chamber of the second module is configured to receive the diluted draw solution from the FO component and use the diluted draw solution as at least a portion of the second feed solution.

Statement 95: A system according to Statement 89, wherein the first feed solution source comprises a reverse osmosis (RO) component, the RO component producing a permeate solution and a concentrated RO feed solution stream from a RO feed solution stream, wherein the first feed solution stream comprises at least a portion of the concentrated RO feed solution stream.

Statement 96: A system according to Statement 95, wherein the second feed solution source comprises the RO component, the second solution stream comprising at least a portion of the concentrated RO feed solution stream.

Statement 97: A system according to Statement 96, wherein the second chamber is configured to transfer at least a portion of the diluted second feed solution stream to the RO component, the RO component configured to receive the at least a portion of the diluted second feed solution stream from the second chamber, the RO feed solution stream comprising at least in part the diluted second feed solution stream.

Statement 98: A system according to Statement 97, further comprising a forward osmosis (FO) component fluidically coupled with the RO component and the at least one module, the FO component configured to produce a diluted draw solution and a concentrated feed solution from a draw solution and a FO feed solution stream, wherein the first chamber of the at least one module is configured to transfer the produced concentrated first feed solution stream to the FO component, the FO component configured to receive the concentrated first feed solution stream from the first chamber of the at least one module and use at least a portion of the concentrated first feed solution stream as the draw solution.

Statement 99: A system according to Statement 98, wherein the FO component is configured to transfer the diluted draw solution stream to the RO component, the RO component configured to receive the diluted draw solution stream from the FO component and use at least a portion of the diluted draw solution stream as the RO feed solution stream.

What is claimed is:

1. A system comprising:
   a first feed solution source;
   a second feed solution source; and
   at least one module, each of the at least one module comprising:
   a first chamber and a second chamber;
   a semipermeable membrane disposed at the interface between the first chamber and the second chamber, the semipermeable membrane having a first side in fluidic communication with the first chamber and a second side in fluidic communication with the second chamber;
   wherein the first chamber is configured to receive a first feed solution stream from the first feed solution source and the second chamber is configured to receive a second feed solution stream from the second feed solution source,
   the first feed solution stream having a first solute concentration and a first osmotic pressure, and the second feed solution stream having a second solute concentration and a second osmotic pressure, wherein the first osmotic pressure is greater than or equal to the second osmotic pressure; and
   wherein the first feed solution source is configured to provide hydrostatic pressure to the first chamber so as to produce a concentrated first feed solution stream and a diluted second feed solution stream by solvent passing from the first chamber to the second chamber via the semipermeable membrane,
   wherein the first feed solution source comprises a reverse osmosis (RO) component, the RO component producing a permeate solution and a concentrated RO feed solution stream from a RO feed solution stream, wherein the first feed solution stream comprises at least a portion of the concentrated RO feed solution stream, and wherein at least a portion of the RO feed solution stream comprises the diluted second feed solution stream, and
   wherein a forward osmosis (FO) component is fluidically coupled with the RO component and the at least one module, the FO component configured to produce a diluted draw solution stream and a concentrated feed solution stream from a draw solution and a FO feed solution stream, wherein the first chamber of the at least one module is configured to transfer the produced concentrated first feed solution stream to the FO component, the FO component configured to receive the concentrated first feed solution stream from the first chamber of the at least one module and use at least a portion of the concentrated first feed solution stream as the draw solution.

2. The system according to claim 1, wherein the at least one module comprises a plurality of modules, wherein the first chamber of each module of the plurality of modules is fluidically coupled with the first chamber of at least one other module.

3. The system according to claim 2, wherein the plurality of modules comprises a first module and a second module, the first chamber of the first module fluidically coupled with the first chamber of the second module, and wherein the first chamber of the second module is configured to receive the concentrated first feed solution stream from the first chamber of the first module, wherein the first chamber of the first module comprises a first inlet port configured to receive the first feed solution stream from the first feed solution source and a first exit port, and the first chamber of the second module comprises a second inlet port fluidically coupled to the first exit port, the second inlet port configured to receive the concentrated first feed solution stream from the first chamber of the first module, and wherein the second chamber of the second module is fluidically coupled with the second chamber of the first module, and wherein the second chamber of the second module is configured to receive the diluted second feed solution from the second chamber of the first module.

4. The system according to claim 3, wherein the forward osmosis (FO) component is fluidically coupled with at least the first chamber of the second module, wherein the first chamber of the second module is configured to deliver the draw solution to the FO component and use the diluted draw solution as at least a portion of the first feed solution of the second feed solution.

5. A system comprising:
a first feed solution source;
a second feed solution source; and
at least one module, each of the at least one module comprising:
a first chamber and a second chamber;
a semipermeable membrane disposed at the interface between the first chamber and the second chamber, the semipermeable membrane having a first side in fluidic communication with the first chamber and a second side in fluidic communication with the second chamber;
wherein the first chamber is configured to receive a first feed solution stream from the first feed solution source and the second chamber is configured to receive a second feed solution stream from the second feed solution source,
the first feed solution stream having a first solute concentration and a first osmotic pressure, and the second feed solution stream having a second solute concentration and a second osmotic pressure, wherein the first osmotic pressure is greater than or equal to the second osmotic pressure; and wherein the first feed solution source is configured to provide hydrostatic pressure to the first chamber so as to produce a concentrated first feed solution stream and a diluted second feed solution stream by solvent passing from the first chamber to the second chamber via the semipermeable membrane,
wherein the first feed solution source comprises a reverse osmosis (RO) component, the RO component producing a permeate solution and a concentrated RO feed solution stream from a RO feed solution stream, wherein the first feed solution stream comprises at least a portion of the concentrated RO feed solution stream, and wherein at least a portion of the RO feed solution stream comprises the diluted second feed solution stream, and
wherein the second chamber is configured to transfer at least a portion of the diluted second feed solution stream to the RO component, the RO component configured to receive the at least a portion of the diluted second feed solution stream from the second chamber, the RO feed solution stream comprising at least in part the diluted second feed solution stream, the system further comprising a forward osmosis (FO) component fluidically coupled with the RO component and the at least one module, the FO component configured to produce a diluted draw solution stream and a concentrated feed solution stream from a draw solution and a FO feed solution stream, wherein the first chamber of the at least one module is configured to transfer the produced concentrated first feed solution stream to the FO component, the FO component configured to receive the concentrated first feed solution stream from the first chamber of the at least one module and use at least a portion of the concentrated first feed solution stream as the draw solution, wherein the FO component is configured to transfer the diluted draw solution stream to the RO component, the RO component configured to receive the diluted draw solution stream from the FO component and use at least a portion of the diluted draw solution stream as the RO feed solution stream.

6. The system of claim 1, wherein the FO component is configured to transfer at least a portion of the diluted draw solution stream to the second chamber of the at least one module.

7. The system of claim 1, wherein the first osmotic pressure of the first feed solution stream is greater than the second osmotic pressure of the second feed solution stream.

8. The system of claim 5, wherein the first osmotic pressure of the first feed solution stream is greater than the second osmotic pressure of the second feed solution stream.

* * * * *